US011132821B1

(12) United States Patent
Gupta et al.

(10) Patent No.: US 11,132,821 B1
(45) Date of Patent: Sep. 28, 2021

(54) PROVIDING GRAPHICAL USER INTERFACE TOOLS FOR EFFICIENTLY SELECTING HANDLES IN VECTOR ARTWORK ON TOUCH-BASED DEVICES

(71) Applicant: Adobe Inc., San Jose, CA (US)

(72) Inventors: Angad Kumar Gupta, Noida (IN); Taniya Vij, New Delhi (IN)

(73) Assignee: Adobe Inc., San Jose, CA (US)

(*) Notice: Subject to any disclaimer, the term of this patent is extended or adjusted under 35 U.S.C. 154(b) by 0 days.

(21) Appl. No.: 16/883,402

(22) Filed: May 26, 2020

(51) Int. Cl.
  *G06T 11/20* (2006.01)
  *G06F 3/0488* (2013.01)

(52) U.S. Cl.
  CPC .......... *G06T 11/20* (2013.01); *G06F 3/04883* (2013.01); *G06T 2200/24* (2013.01)

(58) Field of Classification Search
  CPC .......................... G06T 11/20; G06F 3/04883
  USPC ....................................................... 345/173
  See application file for complete search history.

(56) References Cited

U.S. PATENT DOCUMENTS

| 7,356,777 B2* | 4/2008 | Borchardt | G06F 3/04815 715/836 |
| 8,146,021 B1* | 3/2012 | Asente | G06F 3/04883 715/863 |
| 2006/0050969 A1* | 3/2006 | Shilman | G06F 40/171 382/224 |
| 2008/0297482 A1* | 12/2008 | Weiss | G06F 3/041 345/173 |
| 2017/0364243 A1* | 12/2017 | Regnier | B60K 35/00 |
| 2021/0019925 A1* | 1/2021 | Garcia Salvadores | G06T 11/60 |

* cited by examiner

*Primary Examiner* — William D Titcomb
(74) *Attorney, Agent, or Firm* — Keller Jolley Preece

(57) ABSTRACT

Methods, systems, and non-transitory computer readable media are disclosed for generating a modified vector drawing based on user input in a magnified view. The disclosed system presents a vector drawing comprising anchor points in a drawing view. In one or more embodiments, the disclosed system determines that a user interaction (e.g., a user touch gesture) with the vector drawing results in an ambiguous selection of two or more anchor points. Based on this determination, the disclosed system can determine a magnification level for a magnified view in which the two or more anchor points are spaced at least a touch diameter. The disclosed system may receive a selection of an anchor point in the magnified view and user input indicating an operation to be performed on the selected anchor point. The disclosed system can generate a modified vector drawing by performing the operation.

20 Claims, 17 Drawing Sheets

Determine Touch Location And Touch Radius 302

Traverse The Art Tree To Perform Hit Detection 304

Determine That The Touch Area Contains Two Or More Anchor Points 306

PROVIDING GRAPHICAL USER INTERFACE TOOLS FOR EFFICIENTLY SELECTING HANDLES IN VECTOR ARTWORK ON TOUCH-BASED DEVICES

BACKGROUND

Recent years have seen significant improvement in hardware and software platforms for generating and editing computer graphics. For example, developers have created technologies to modify or improve computer graphics platforms to create graphic images including vector graphics. To illustrate, conventional vector graphic design systems often provide digital tools to assist designers in creating and modifying vector graphics. More particularly, conventional vector graphic design systems present vector graphic design options to designers via touch-based devices (e.g., smartphones and tablets).

SUMMARY

One or more embodiments provide benefits and/or solve one or more problems in the art with systems, methods, and non-transitory computer readable storage media that provide graphical user interfaces and associated tools that allow for increased accuracy and efficiency when editing vector graphics using touch-based devices. In particular, the disclosed system can present a vector graphic and determine an ambiguous selection of two or more anchor points or paths on a canvas. Based on determining the ambiguous selection, the disclosed system can generate and provide an interactive magnifier in the graphical user interface showing a zoomed view of the anchor points and/or paths. In particular, the disclosed system can receive precise selections of an anchor point or path via the interactive magnifier. Furthermore, the disclosed system can perform an operation on a selected anchor point and reflect the operation in both the interactive magnifier and also on the main canvas.

Additional features and advantages of one or more embodiments of the present disclosure will be set forth in the description which follows, and in part will be obvious from the description, or may be learned by the practice of such example embodiments.

BRIEF DESCRIPTION OF THE DRAWINGS

Various embodiments will be described and explained with additional specificity and detail through the use of the accompanying drawings which are summarized below.

DETAILED DESCRIPTION

Figure 1:
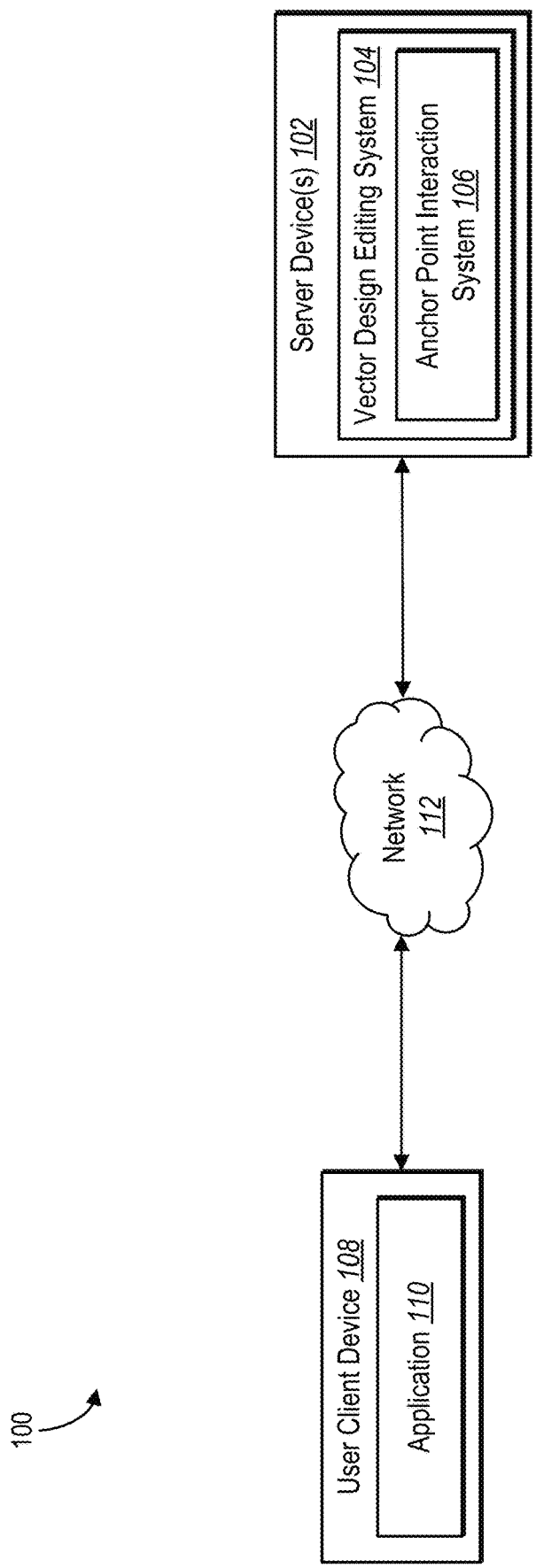
FIG. 1 illustrates an environment in which an anchor point interaction system can operate in accordance with one or more embodiments of the present disclosure.

One or more embodiments of the present disclosure include an anchor point interaction system that efficiently and accurately performs operations on anchor points of a vector drawing on touch-based devices via intelligent graphical user interfaces and tools. For example, the anchor point interaction system can precisely select and perform operations on an anchor point that is located in close proximity to other anchor points. In particular, the anchor point interaction system can determine when a touch results in an ambiguous selection of two or more anchor points. Based on this determination, the anchor point interaction system may open an interactive magnifier that presents a zoomed view for a designer to make a precise selection of an anchor point. In particular, the anchor point interaction system may determine a magnification level for the interactive magnifier at which a touch in the interactive magnifier results in an unambiguous anchor point selection. Following the precise selection of an anchor point, the anchor point interaction system can perform operations on the selected anchor point to generate a modified vector drawing.

More particularly, the anchor point interaction system may utilize hit detection techniques on underlying data or metadata of a vector graphic to determine whether a user's interaction will result in an ambiguous anchor point selection. The anchor point interaction system may present, at a graphical user interface, a vector drawing. The anchor point interaction system may receive and analyze a user interaction with the vector drawing. For instance, the anchor point interaction system might receive and analyze a touch received via a touch-based device. By performing hit detection techniques on an art tree of the vector graphic, the anchor point interaction system can identify whether the touch results in an ambiguous selection of two or more anchor points.

Based on the an ambiguous selection of two or more anchor points, the anchor point interaction system may determine a magnification level for a magnified view. Generally, the anchor point interaction system may present a magnified graphical user interface window showing a zoomed view of the design and anchor points. The anchor point interaction system can ensure that the distance between any two anchor points will be such that any user selection within the magnified window will result in an unambiguous selection of an anchor point. For instance, the anchor point interaction system may determine a magnification level based on the two or more anchor points and a touch diameter.

The anchor point interaction system may present a magnified view as an overlay over the graphical user interface and perform operations on anchor points selected within the magnified view. More specifically, the anchor point interaction system may present, within the magnified view, the two or more anchor points at the determined magnification level. The magnified view can allow a user to unambiguously select an anchor point(s). The anchor point interaction system can perform operations on a selected anchor point based on user selection and interaction with the anchor point within the magnified view. Thus, the anchor point interaction system may generate a modified vector drawing based on performing the operation on the selected anchor point(s).

Furthermore, the anchor point interaction system can present a graphical user interface that displays the magnified view together with a drawing view. Generally, the drawing view shows an overview of the vector drawing. For instance, the drawing view might display the entire vector drawing. When the anchor point interaction system performs operations on the selected anchor point within the magnified view, the anchor point interaction system may also reflect those operation results at the drawing view. Thus, the anchor point interaction system reflects operations performed in the magnifier view on the drawing view to present a real-time visualization of the vector drawing as a whole.

The anchor point interaction system also provides several technical benefits relative to conventional systems. Specifically, conventional vector design editing systems are often inaccurate and inefficient. Conventional vector design editing systems often inaccurately select anchor points in a vector drawing. For instance, conventional vector design editing systems often display vector drawings at magnification levels at which anchor points are in close proximity to each other. Especially when receiving touch input via touch-based devices, conventional systems are often unable to correctly identify an anchor point within a touch area.

Some conventional vector design editing systems attempt to resolve the foregoing shortcomings by zooming into an area for anchor point selection. For example, for touch-based devices, conventional systems may zoom into an area based on a detected pinch-spread gestures by a user. Unfortunately, such methods of zooming into areas of interest are often inefficient. Indeed, conventional systems are often unable to select the correct anchor point after one cycle of zooming and thus require users to repeat the cycle. For instance, when a conventional system selects an incorrect anchor point, conventional systems often require the user to reset the selection, increase the zoom even further, and re-select the desired anchor point. Without a guarantee of an unambiguous selection, users are often required to go through multiple zoom and selection cycles to select the correct anchor point.

Furthermore, even if conventional vector design editing systems eventually select the correct anchor point, conventional systems often inefficiently display the effects of operations on the selected anchor point. In particular, vector designs typically consist of numerous smaller art objects, which when viewed together form the vector design. As mentioned, conventional systems often require users to zoom far into a smaller art object in order to select and perform operations on individual anchor points corresponding to the art object. Conventional systems often display the effects of the operation at the zoomed level and require users to zoom out to visualize the changes to the vector design as a whole. Thus, conventional systems often present inefficient user interfaces for showing the effects of operations on anchor points.

Furthermore, many of these steps required by conventional systems require high precision user input in order to arrive at a good quality result (e.g., proper selection). The high precision required can make it difficult or impossible to perform such operations using hand held devices (e.g., smart phones or tablets) due to the lack of screen space. As such, conventional systems often editing of vector-based artwork or drawings to be performed on traditional desktop computers with traditional input/output devices (e.g., a computer mouse and larger screens). As such, conventional systems can require users to transfer vector drawings to other devices (e.g., a traditional desktop computer) in order to performing editing.

The anchor point interaction system can improve accuracy relative to conventional systems. The anchor point interaction system utilizes hit detection techniques on the metadata corresponding to vector drawings to intelligently determine whether a user's interaction will result in ambiguous selection of two or more anchor points. Based on identifying the potential ambiguous anchor point selection, the anchor point interaction system can present a magnification view displaying the two or more anchor points within the touch area. More specifically, the magnification view is at a magnification level such that any user interaction will result in an unambiguous selection. By receiving a selection of an anchor point within the magnification view, the anchor point interaction system can improve the accuracy of anchor point selection.

The anchor point interaction system can improve efficiency relative to conventional systems. In particular, the anchor point interaction system can decrease the amount of time and computing resources often required by conventional systems to select the correct anchor point. In contrast to conventional systems that often require users to repeat a process of zooming and selecting anchor points, the anchor point interaction system can intelligently determine a magnification level for the magnification view. More specifically, the anchor point interaction system determines the magnification level at which any user touch will result in the unambiguous selection of a single anchor point. Thus, rather than requiring users to zoom into vector designs at arbitrary levels, the anchor point interaction system can automatically and immediately surface the proper magnification level for precise anchor point selection.

Furthermore, the anchor point interaction system can more efficiently display the effects of operations in a graphical user interface. In particular, the anchor point interaction system presents the magnified view of an area including the two or more anchor points together with the drawing view. The anchor point interaction system can present, via the drawing view, the vector drawing as a whole. The anchor point interaction system reflects editing operations performed on selected anchor points within the magnification view at the drawing view. Thus, the anchor point interaction system simultaneously surfaces the effects of operations on both the individual anchor point as well as to the vector drawing as a whole.

In addition to more efficient use of computing resources, in some embodiments, the diverse recommendation system also provides interactive elements within a graphical user interface that introduces a novel functionality—quickly and efficiently facilitating the selection of anchor points. Conventional graphical user interfaces that such lack tools require navigating between graphical user interfaces (e.g., a zoomed in graphical user interface and a zoomed out graphical user interface) and a high number of user inputs (repeated zooming, panning, selecting, and deselecting). The anchor point interaction system improves the efficiency of computing devices by reducing or eliminating the need to navigate between multiple user interfaces as required by conventional systems. In particular, the anchor point interaction system allows a user to select anchor points via a magnification view without navigating away from a graphical user interface showing the entire or a large portion of the vector drawings. Based on user input received in a single user interface, the anchor point interaction system can select desired anchor points and perform edits on the selected anchor points. Furthermore, by increasing the ease of selecting anchor points, the anchor point interaction system can allow for efficient editing of vector drawings using handheld devices (e.g., smart phones and tablets) with limited screen space.

The following disclosure provides additional detail regarding the anchor point interaction system in relation to illustrative figures portraying example embodiments and implementations of the anchor point interaction system. For example, FIG. 1 illustrates a schematic diagram of a system environment (or "environment") 110 in which an anchor point interaction system 106 can operate in accordance with one or more embodiments. As illustrated, the environment 100 includes one or more server device(s) 102 connected to a user client device 108 via a network 112. While FIG. 1 shows an embodiment of the anchor point interaction system 106, alternative embodiments and configurations are possible.

As shown in FIG. 1, the server device(s) 102 and the user client device 108 are connected via the network 112. Each of the components of the environment 100 can communicate via the network 112. The network 112 comprises any suitable network over which computing devices can communicate. Example networks are discussed in additional detail below in relation to FIG. 11.

As illustrated in FIG. 1, the environment 100 includes the server device(s) 102. The server device(s) 102 may generate, store, receive, and transmit digital content including software hosted at the server device(s) 102, digital video, digital images, digital audio, digital designs, metadata, etc. In particular, the server device(s) 102 can provide or support various graphical user interfaces and digital content including vector designs to devices such as the user client device 108 via the network 112. For example, the server device(s) 102 may receive and modify vector designs from the user client device 108. Additionally or alternatively, the server device(s) 102 may generate and modify vector designs and present the vector designs at the user client device 108. In some embodiments, the server device(s) 102 comprise a distributed server where the server device(s) 102 include a number of server devices distributed across the network 112 and located in different physical locations. The server device(s) 102 can comprise a content server, an application server, a communication server, a web-hosting server, or a digital content management server.

As further shown in FIG. 1, the server device(s) 102 includes a vector design editing system 104. In one or more embodiments, the vector design editing system 104 comprises a digital artwork management system that facilitates the creation and modification of vector designs over the network 112. Furthermore, the vector design editing system 104 manages various components of vector designs including the mathematical algorithms (e.g., Bezier curves) that are the basis for the vector designs. For example, the vector design editing system 104 can present user-friendly graphical user interfaces tools to receive user input for creating and manipulating vector designs. More specifically, the anchor point interaction system 106 can transmit, to the user client device 108, graphical user interfaces and corresponding tools for manipulating or otherwise editing vector designs.

As illustrated in FIG. 1, the anchor point interaction system 106 is implemented as part of the vector design editing system 104. Generally, the anchor point interaction system 106 can generate a modified vector drawing by performing operations on anchor points (also referred to herein as handles). More specifically, the anchor point interaction system 106 can present vector drawings for display at the user client device 108. The anchor point interaction system 106 receives user interaction with the vector drawings. The anchor point interaction system 106 can determine whether a user interaction will result in an ambiguous selection of two or more anchor points. Based on identifying an ambiguous selection of two or more anchor points, the anchor point interaction system 106 determines a magnification level that will result in an unambiguous selection of one of the two or more anchor points. The anchor point interaction system 106 presents a magnified view displaying the two or more anchor points at the magnification level and receives a selection of an anchor point of the two or more anchor points. The anchor point interaction system 106 generates a modified vector drawing based on operations performed on the selected anchor point. The anchor point interaction system 106 can communicate with the user client device 108.

As illustrated in FIG. 1, the environment 100 includes the user client device 108. The user client device 108 can generate, store, receive, and send digital data. For example, the user client device 108 communicates with the server device(s) 102 via the network 112. The user client device 108 illustrated in FIG. 1 may comprise various types of client devices. For example, in some embodiments, the user client device 108 includes mobile devices such as laptops, tablets, mobile telephones, smartphones, etc. In other embodiments, the user client device 108 includes non-mobile devices, such as desktops or servers, or other types of client devices. In at least one embodiment, the user client device 108 comprises a touch-based device operated by touching icons and images on an LCD screen in lieu of, or in addition to, pressing physical buttons. Example of touch-based devices may include smartphones, tablets, laptops having touch pads, and other types of devices. Additional details with regard to the user client device 108 are discussed below with respect to FIG. 11.

The user client device 108 can be associated with a user of a digital artwork management platform managed by the vector design editing system 104. As mentioned, the user client device 108 communicates with the server device(s) 102. In particular, the user client device 108 uploads and sends digital data including vector drawings and user input to the server device(s) 102 via the network 112. For example, the user client device 108 can display graphical user interfaces including vector drawings and vector drawing modification tools to a user associated with the user client device 108.

As further illustrated in FIG. 1, the user client device 108 includes an application 110. The application 110 may be a web application or a native application on the user client device 108 (e.g., a mobile application, a desktop application, etc.). The application 110 can interface with the anchor point interaction system 106 to provide digital data including graphical user interfaces, user interactions, digital designs, and operations. For example, the application 110 may comprise a mobile application that renders a graphical user interface that includes vector drawings and tools for generating and/or modifying vector drawings. Additionally, the application 110 may also render a graphical user interface for uploading vector drawings. The application 110 can send and receive data from the anchor point interaction system 106 and can present, for display at the user client device 108, vector drawings and modified vector drawings. More specifically, the application 110 can present, for display at the user client device 108, a magnified view together with a drawing view of a vector drawing.

Although FIG. 1 depicts the anchor point interaction system 106 located on the server device(s) 102, in some embodiments, the anchor point interaction system 106 may be implemented by (e.g., located entirely or in part) on one or more other components of the environment 100. For example, the anchor point interaction system 106 may be implemented entirely (or in part) on the user client device 108. For example, the server device(s) 102 and/or the user client device 108 can have the vector drawings stored thereon.

Additionally, the user client device 108 can communicate directly with the anchor point interaction system 106, bypassing the network 112. Moreover, the anchor point interaction system 106 can access one or more databases (e.g., a vector design database) housed on the server device(s) 102 or elsewhere in the environment 100. Further, the anchor point interaction system 106 can include one or more machine learning models (e.g., neural networks), and the anchor point interaction system 106 can be implemented in a variety of different ways across the server device(s) 102, the network 112, and the user client device 108.

Figure 2A:
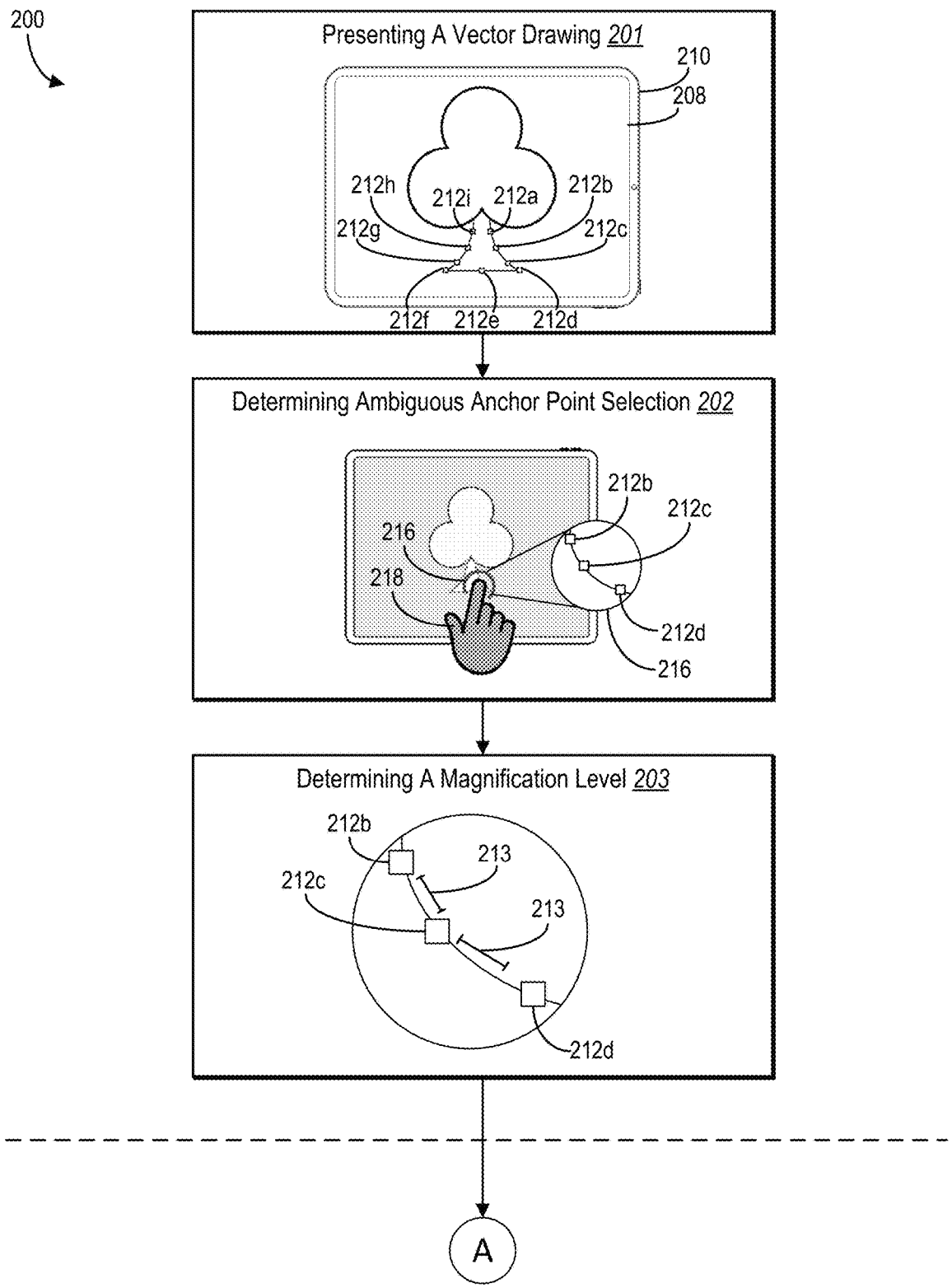
FIGS. 2A-2B illustrate an overview of steps that the anchor point interaction system can perform when generating and presenting a magnified view for receiving user input in accordance with one or more embodiments of the present disclosure.
Figure 2B:
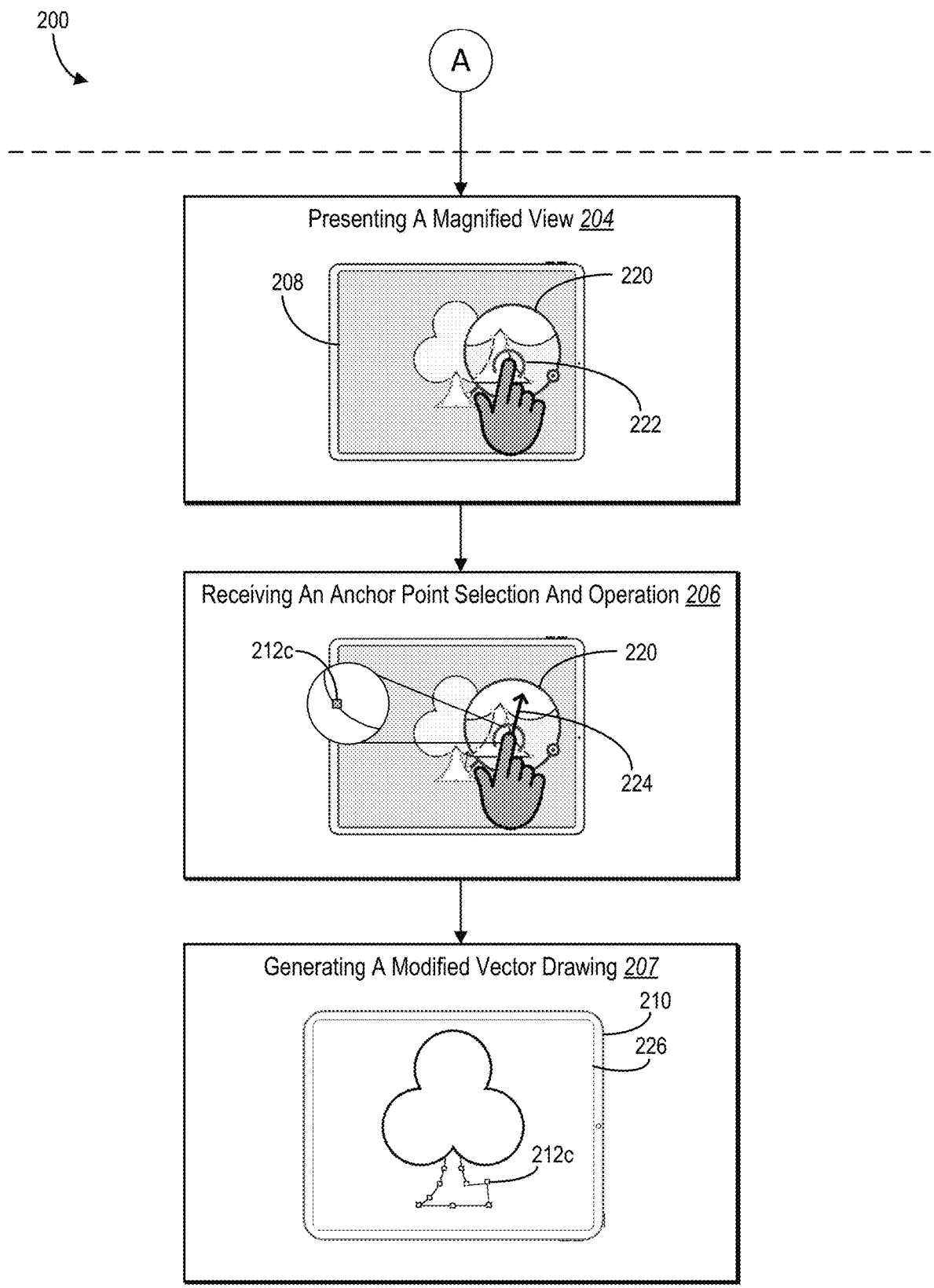

FIGS. 2A-2B illustrate a general overview of a series of acts performed by the anchor point interaction system 106 to generate a modified vector drawing in one embodiment. The series of acts 200 includes an act 201 of presenting a vector drawing, an act 202 of determining an ambiguous anchor point selection, an act 203 of determining a magnification level, an act 204 of presenting a magnified view, an act 206 of receiving an anchor point selection and operation, and an act 207 of generating a modified vector drawing.

As illustrated in FIG. 2A, the anchor point interaction system 106 performs the act 201 of presenting a vector drawing. In particular, the anchor point interaction system 106 presents a vector drawing at a user client device 210 in a drawing view graphical user interface 208. A vector drawing (or vector design) can comprise computer graphics images composed of lines and curves defined by mathematical algorithms (i.e., Bezier curves). An anchor point refers to a point along a Bezier spline that that is manipulatable via a handle to change the position of the anchor point and the corresponding shape of the Bezier spline. In some embodiments, an anchor point is selectable and moveable to change the shape of the Bezier spline. An anchor point can coincide with a control point of a Bezier spline, but an anchor point is not necessarily the same as a control point.

A control point refers to a point that defines a position and/or a geometry of at least a portion of a Bezier spline or a Bezier curve. A control point can refer to an endpoint that defines the beginning or the end of a Bezier spline or a Bezier curve. A control point can also refer to a middle point that may or may not fall directly on a Bezier spline or a Bezier curve but whose relationship with other control points (e.g., the endpoints) defines the shape or the geometry of the resulting Bezier spline or Bezier curve. Indeed, a Bezier curve can include "endpoints" defining the ends of the Bezier curve. A Bezier curve can further include "middle points" defining control points other than the endpoints and whose position (on or off of the Bezier curve) relative to the endpoints dictates the shape of the Bezier curve.

Relatedly, a Bezier spline refers to a parametric path that spans between anchor points. In particular, a Bezier spline can refer to a parametric path that is related to the Bernstein polynomial and that is defined by a set of control points, where the first and last control points are the endpoints of the Bezier spline and where the curvature of the Bezier spline is based on tangent vectors of the control points. In some embodiments, a Bezier spline can include a parametric curve or segment or a combination of multiple parametric curves or segments. A Bezier spline is manipulatable (i.e., can be modified) via anchor points and/or handles to change positions of anchor points and/or curvature of the Bezier spline to thereby modify the shape or geometry of the Bezier spline.

As illustrated in FIG. 2A, the vector drawing comprises anchor points 212a-212h. In particular, a path within a vector drawing comprises a series of anchor points and segments between the anchor points. For instance, paths within a vector drawing can be made up of segments whose beginnings and ends are marked by anchor points. For example, as illustrated, the vector drawing includes a path 214. The path 214 comprises the anchor points 212a-212h connected by a series of segments. Furthermore, anchor points can comprise interactive graphical user interface elements.

The anchor point interaction system 106 can utilize user interaction with the anchor points to perform operations on the vector drawing. More specifically, the anchor point interaction system 106 may perform operations on individual anchor points and/or paths. Operations can include moving, deleting, copying, aligning, and others. For example, based on detecting that a user has selected and dragged a single anchor point, the anchor point interaction system 106 can perform the operation of moving the anchor point and make corresponding adjustments to connected segments. Additionally or alternatively, the anchor point interaction system 106 can detect the selection of a path and perform operations on the path as a whole. For example, based on detecting user interaction with the path 214, the anchor point interaction system 106 can perform operations on the path 214.

As part of the act 201 illustrated in FIG. 2A, the anchor point interaction system 106 presents the vector drawing in a drawing view graphical user interface 208. Generally, a drawing view graphical user interface provides an overview of component paths of the vector drawing. The anchor point interaction system 106 may determine the magnification level of the drawing view automatically or based on user input. For example, as illustrated in FIG. 2A, the anchor point interaction system 106 automatically determines the magnification level of the drawing view graphical user interface 208 to display the entire vector drawing. In another embodiment, the anchor point interaction system 106 can present the vector drawing at an increased magnification level based on the user selecting a greater magnification level.

As illustrated in FIG. 2A, the anchor point interaction system 106 performs the act 202 of determining an ambiguous anchor point selection. As part of the act 202, the anchor point interaction system 106 receives a user interaction with the vector drawing. In one or more embodiments, the user interaction may comprise a user touch at a touch-based device and/or another type of user selection (e.g., a mouse click). For example, as illustrated, the anchor point interaction system 106 receives a user interaction 216 from user 218. In one or more other embodiments, the anchor point interaction system 106 may determine that the user interaction results in an unambiguous selection of a single anchor point and will accordingly select the single anchor point.

Figure 3:
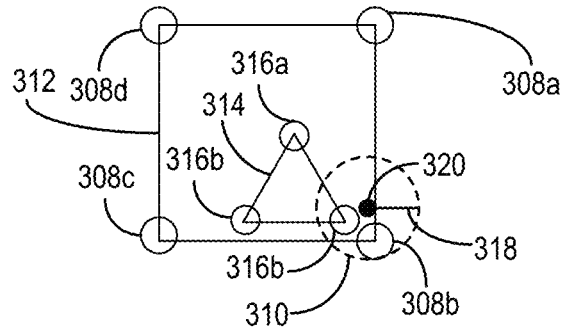
FIG. 3 illustrates an overview of steps that the anchor point interaction system can perform when determining that a user interaction results in an ambiguous selection of two or more anchor points in accordance with one or more embodiments of the present disclosure.
Figure 3:
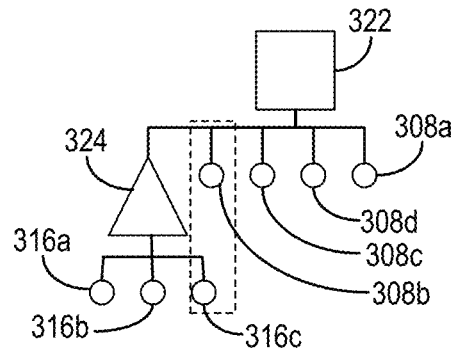
Figure 3:
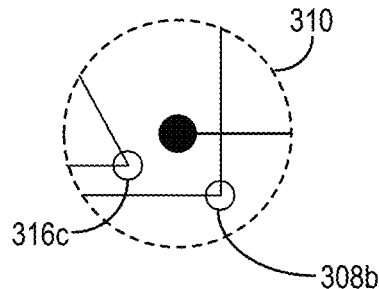

As illustrated in FIG. 2A, as part of the act 202, the anchor point interaction system 106 determines that the user interaction results in an ambiguous selection of two or more anchor points. As illustrated, the anchor point interaction system 106 determines that a user interaction 216 results in ambiguous selection of the anchor points 212b, 212c, and 212d. As mentioned previously, the anchor point interaction system 106 may intelligently determine that a user interaction results in an ambiguous selection of two or more anchor points. FIG. 3 and the corresponding discussion provide additional detail regarding how the anchor point interaction system 106 determines that a user interaction results in an ambiguous selection of two or more anchor points.

Figure 4:
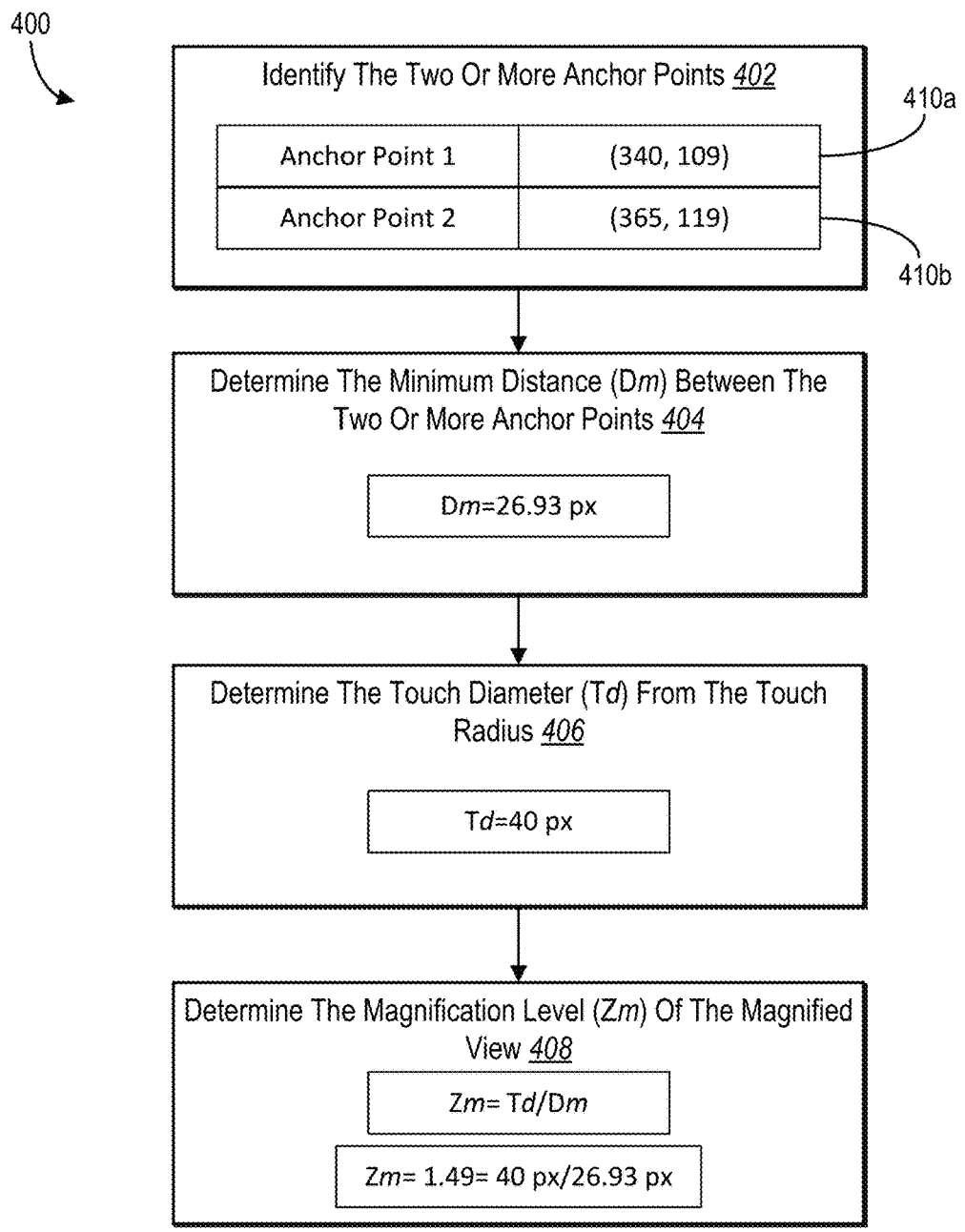
FIG. 4 illustrates an overview of steps that the anchor point interaction system can perform when determining a magnification level of the magnified view in accordance with one or more embodiments of the present disclosure.

The anchor point interaction system 106 performs the act 203 of determining a magnification level. In particular, the anchor point interaction system 106 determines a magnification level for a magnified view that results in a distance between the two or more anchor points being at least a touch diameter. By determining a magnification level at which anchor points are at least a touch diameter apart, the anchor point interaction system 106 ensures that any user interaction within a magnified view results in an unambiguous selection of a single anchor point. For example, as illustrated in FIG. 2A, the anchor point interaction system 106 determines a magnification level at which distances between the anchor points 212b, 212c, and 212d are at least a touch diameter 213. FIG. 4 and the corresponding discussion provide additional detail regarding how the anchor point interaction system 106 intelligently determines the magnification level for a magnified view.

Figure 6A:
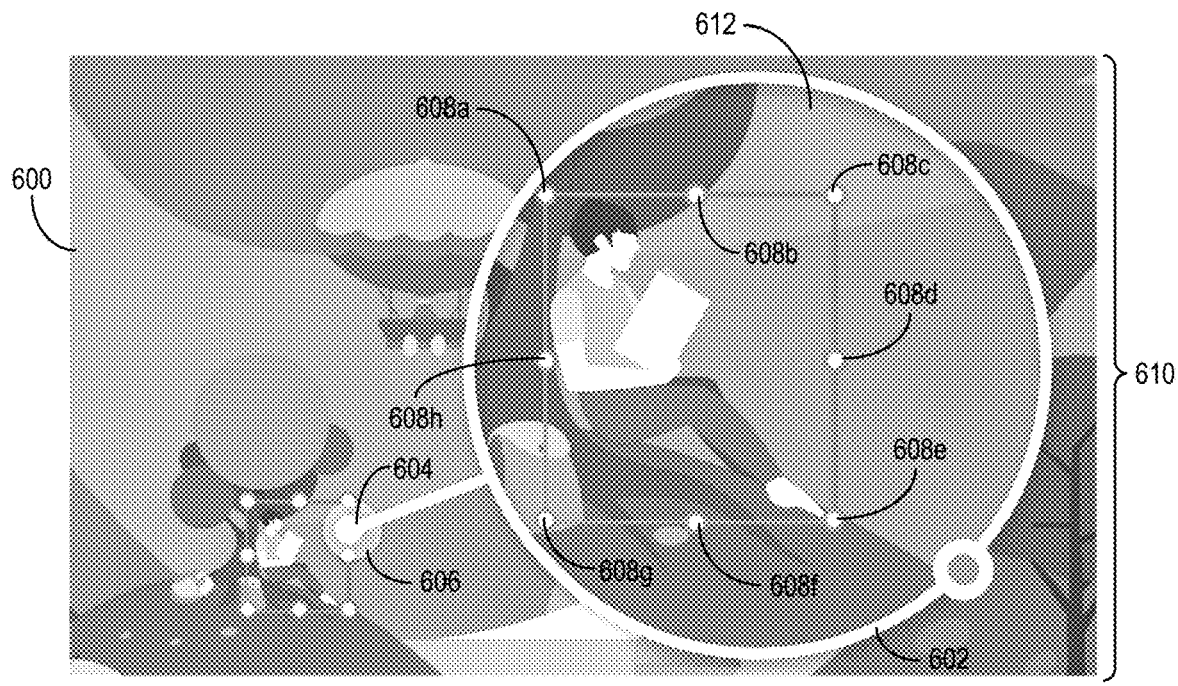
FIGS. 6A-6B illustrate example magnified views within the graphical user interfaces displaying different areas based on user interaction with a magnifier handle in accordance with one or more embodiments of the present disclosure.
Figure 6B:
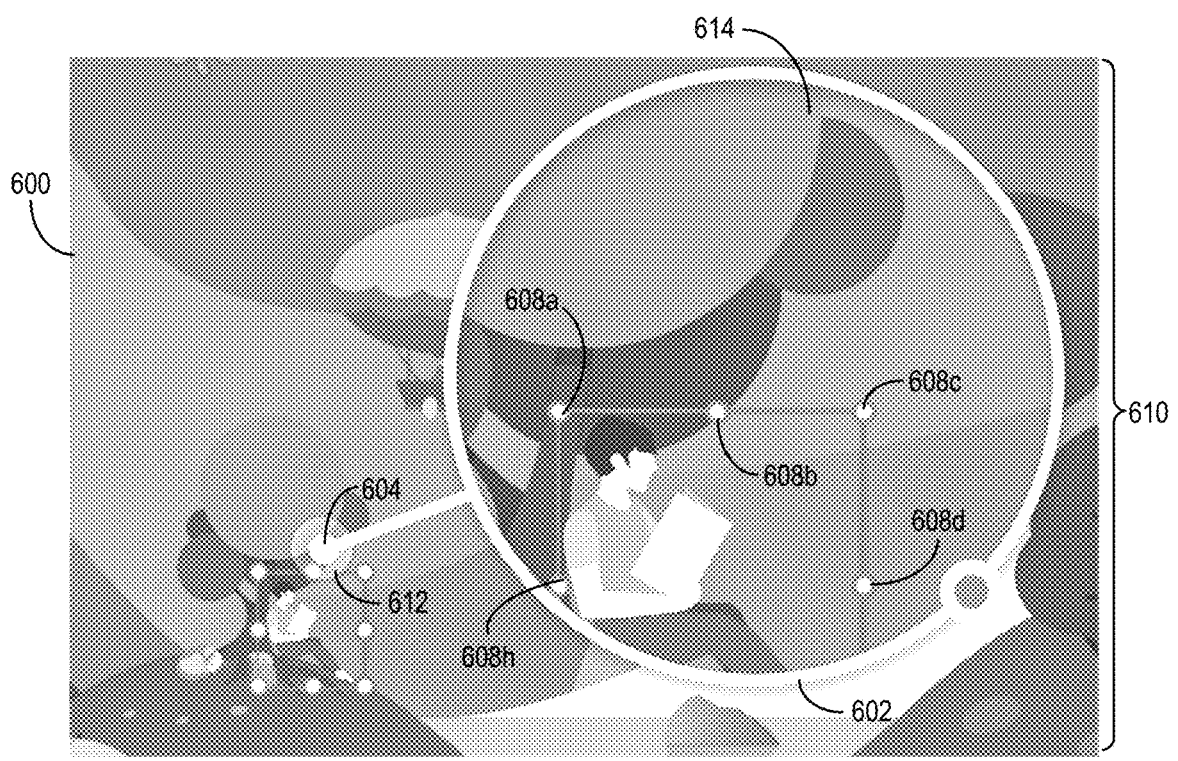

As illustrated in FIG. 2B, the series of acts 200 includes the act 204 of presenting a magnified view. In particular, the anchor point interaction system 106 presents, together with the drawing view, a magnified view of an area about the two or more anchor points at the magnification level. As shown, the anchor point interaction system 106 presents magnified view 220 as a graphical user interface overlay over a portion of the drawing view graphical user interface 208. The magnified view 220 displays an area including the anchor points 212b-212d. As mentioned, the anchor point interaction system 106 presents the magnified view 220 together with the drawing view 208. By juxtaposing the drawing view 208 and the magnified view 220, the anchor point interaction system 106 efficiently identifies the location of a single anchor point within the vector drawing as a whole. Additionally, the anchor point interaction system 106 may receive a user selection 222 of an anchor point via the magnified view 220. Furthermore, the anchor point interaction system 106 may dynamically change the area displayed within the magnified view 220. FIGS. 6A-6B and the corresponding discussion provide additional detail regarding the anchor point interaction system 106 changing the area displayed within the magnified view.

The series of acts 200 includes the act 206 of receiving an anchor point selection and operation. In particular, the act 206 comprises receiving, via the graphical user interface, a selection of an anchor point of the two or more anchor points and user input indicating an operation to be performed on the selected anchor point. For example, as illustrated in FIG. 2B, the anchor point interaction system 106 receives a selection of the anchor point 212c within the magnified view graphical user interface overlay 220. Additionally, the anchor point interaction system 106 receives user input comprising an instruction to manipulate the selected anchor point 212c (e.g., move the anchor point 212c). For example, as indicated by arrow 224, the user input indicates that the operation to be performed comprises moving the anchor point 212c upward and to the right.

As illustrated in FIG. 2B, the series of acts 200 also includes the act 207 of generating a modified vector drawing. In particular, the anchor point interaction system 106 performs the operation on the selected anchor point to generate the modified vector drawing. As illustrated, the anchor point interaction system 106 generates a modified vector drawing 226 in which the anchor point 212c has been moved upward and to the right in accordance with the user interaction from the previous act. As illustrated, the anchor point interaction system 106 reflects operations performed within the magnified view 220 in the drawing view. In at least one embodiment, the anchor point interaction system 106 presents the modified vector drawing in both the drawing view and in the magnified view 220.

As mentioned, the anchor point interaction system 106 intelligently determines whether a user interaction results in an ambiguous selection of two or more anchor points. FIG. 3 illustrates a series of acts 300 demonstrating how the anchor point interaction system 106 may intelligently determine whether a user interaction will result in an ambiguous selection of two or more anchor points in accordance with at least one embodiment. The anchor point interaction system 106 can receive, via the graphical user interface at the user client device, a user interaction with the vector drawing. In at least one embodiment, the user interaction comprises a touch gesture. For example, as illustrated in FIG. 3, the anchor point interaction system 106 presents a vector drawing in a graphical user interface that includes object 312 and object 314. The object 312 includes anchor points 308a-308d, and the object 314 includes anchor points 316a-316c. As illustrated, the series of acts 300 includes an act 302 of determining a touch location and touch diameter, an act 304 of traversing an art tree to perform hit detection, and an act 306 of determining that the touch area contains two or more anchor points.

As illustrated in FIG. 3, the series of acts 300 includes the act 302 of determining a touch location and touch radius. In particular, the anchor point interaction system 106 communicates with the user client device to determine properties of the user touch gesture including the touch location 320 and the touch radius 318. Generally, the anchor point interaction system 106 identifies a coordinate point specifying the touch location 320. For example, for iOS user client devices, the anchor point interaction system 106 may access the coordinates of the touch location 320 of a user touch gesture (e.g., UITouch object) by accessing a locationInView property. Additionally, the anchor point interaction system 106 determines the touch radius 318. For example, for iOS user client devices, the anchor point interaction system 106 may access the touch radius 318 by accessing the majorRadius property. The anchor point interaction system 106 may use the value of the touch radius 318 to determine a touch area 310 of the user touch gesture reported by the user client device.

The series of acts 300 includes the act 304 of traversing the art tree to perform hit detection. More specifically, the anchor point interaction system 106 performs hit detection to determine the number of anchor points within the touch area. Generally, hit detection comprises a process of determining whether a user-controlled cursor intersects with a given graphical object. In particular, hit detection is the process of determining whether a user touch gesture intersects with an anchor point presented via a graphical user interface. To perform hit detection, the anchor point interaction system 106 specifies a point coordinate value or an area for testing. In particular, the anchor point interaction system 106 tests the coordinate value of the touch location 320 and the touch radius 318 against the art tree corresponding to the vector drawing to identify anchor points within the touch area 310.

As part of the act 30 of traversing the art tree to perform hit detection, the anchor point interaction system 106 accesses the art tree corresponding to the vector drawing. Generally, an art tree comprises a hierarchical data structure that represents visual structure within a vector drawing. The art tree consists of nodes that represent vector drawing objects organized in a hierarchical manner. Examples of vector drawing objects include groups, text, paths, anchor points, plugins, raster, symbols, and other types of objects. For example, as illustrated in FIG. 3, the anchor point interaction system 106 accesses an art tree. The art tree illustrated as part of the act 304 includes a node 322 representative of the object 312 and a node 324 representative of the object 314. As further illustrated, the art tree includes nodes representing the anchor points 316a-316c of the object 314 and the anchor points 308a-308d of the object 312.

As mentioned, the art tree comprises a hierarchical data structure. In particular, the art tree includes the relationships of objects within a vector design. The nodes of an art tree may begin with a node representing the entire vector drawing then trickle down to nodes representing groups of objects, nodes corresponding to individual objects, and even nodes corresponding to individual anchor points of objects within the vector drawing. For example, the hierarchical organization of the art tree expresses the relationship between the object 312 and the object 314. As illustrated, the object 314 is nested within the object 312. As illustrated in FIG. 3, this relationship is expressed in the art tree because the node 324 corresponding to the object 314 is a child of the node 322 corresponding to the object 312.

As illustrated in FIG. 3, the anchor point interaction system 106 performs the act 304 and traverses the art tree to perform hit detection. Generally, the anchor point interaction system 106 identifies anchor points within the touch area 310 by stepping through (i.e., traversing) the elements of the art tree and comparing coordinate values of each of the elements with the coordinate values of the touch area 310 based on the touch location 320 and the touch radius 318. The anchor point interaction system 106 identifies all anchor points within the touch area 310 even when the anchor points correspond to different objects and different layers.

The anchor point interaction system 106 may determine the starting point in the art tree for the hit detection. In one embodiment, the anchor point interaction system 106 performs hit detection on the entire art tree. For instance, the anchor point interaction system 106 may perform hit detection on the entire art tree by comparing the coordinate values of the touch area 310 with coordinate values of anchor points of every object within the art tree. In other embodiments, the anchor point interaction system 106 selectively performs hit detection on identified portions of the art tree. The anchor point interaction system 106 can identify a common ancestor of all objects of interest within the art tree. For example, based on detecting that the node 322 includes the anchor point 308b that corresponds to the coordinates of the touch area 310, the anchor point interaction system 106 will perform hit detection on the children nodes of the node 322. For instance, the anchor point interaction system 106 performs hit detection on the node 324. Based on the hit detection, the anchor point interaction system determines that the anchor point 316c falls within the touch area of the user touch gesture. In such embodiments, the anchor point interaction system 106 does not perform hit detection on children nodes of parent nodes for which the anchor point interaction system 106 has not identified coordinate value match.

As further illustrated in FIG. 3, the anchor point interaction system 106 performs the act 306 of determining that the touch area contains two or more anchor points. Generally, after performing hit detection the anchor point interaction system 106, evaluates how many anchor points were identified within the touch area 310. Based on determining that only a single anchor point is within the touch area 310, the anchor point interaction system 106 selects the single anchor point. However, the anchor point interaction system 106 determines that the user interaction results in an ambiguous selection based on detecting that the touch area contains two or more anchor points. As illustrated in FIG. 3, the anchor point interaction system 106 determines that the touch area contains the anchor point 316c and the anchor point 308b.

As mentioned, based on determining that the user interaction results in an ambiguous selection of two or more anchor points, the anchor point interaction system 106 determines a magnification level for a magnified view. FIG. 4 and the corresponding discussion provide additional detail regarding how the anchor point interaction system 106 determine the magnification level of the magnified view. In particular, FIG. 4 illustrates a series of acts 400 comprising an act 402 of identifying the two or more anchor points, an act 404 of determining the minimum distance (Dm) between the two or more anchor points, an act 406 of determining the touch diameter (Td) from the touch radius, and an act 408 of determining the magnification level (or "zoom level) (Zm) of the magnified view.

As illustrated in FIG. 4, the series of acts 400 includes the act 402 of identifying the two or more anchor points. Based on detecting an ambiguous selection of two or more anchor points, the anchor point interaction system 106 identifies the locations of the two or more anchor points. More specifically, the anchor point interaction system 106 identifies the coordinate values of the anchor points within the touch area. In at least one embodiment, the anchor point interaction system 106 accesses the (x, y) coordinate values of each of the two or more anchor points. As illustrated, the anchor point interaction system 106 receives coordinate values 410a corresponding to anchor point 1 and coordinate values 410b corresponding to anchor point 2.

In the act 404 illustrated in FIG. 4, the anchor point interaction system 106 determines the minimum distance (Dm) between the two or more anchor points. In one embodiment, as part of the act 404, the anchor point interaction system 106 determines the minimum distance (Dm)

between any of the two or more anchor points identified within the touch area. As illustrated, the anchor point interaction system 106 determines that the distance between anchor point 1 and anchor point 2 equals 26.93 pixels. If the anchor point interaction system 106 determines an ambiguous selection of more than two anchor points, the anchor point interaction system 106 determines the distances between each of the anchor points and identifies the smallest distance as the minimum distance (Dm).

In one or more embodiments, as part of the act 404, the anchor point interaction system 106 determines the minimum distance (Dm) between any two of a set of the two or more anchor points. Generally, rather than determining the minimum distance (Dm) between any of the two or more anchor points, the anchor point interaction system 106 instead identifies a set of the two or more anchor points and determines the minimum distance (Dm) within the set of the two or more anchor points. The smaller the minimum distance (Dm), the greater the magnification level (Zm). Thus, the anchor point interaction system 106 might determine that the minimum distance between any of the two or more anchor points is below a threshold value and would therefore result in a prohibitively large magnification level (Zm). Based on determining that the minimum distance between any of the two or more anchor points is below a threshold value, the anchor point interaction system 106 identifies a set of the two or more anchor points that would yield a greater minimum distance (Dm). The anchor point interaction system 106 may access the art tree to identify the set of the two or more anchor points. The anchor point interaction system 106 may designate anchor points corresponding to a single object as the set of anchor points. In at least one embodiment, the anchor point interaction system 106 designates anchor points of a common ancestor object as the set of anchor points. For instance, the anchor point interaction system 106 may access the art tree to identify an object that both (i) has at least two of its anchor points within the touch area and (ii) is the common ancestor of all objects with anchor points within the touch area.

As illustrated in FIG. 4, the anchor point interaction system 106 performs the act 406 of determining the touch diameter (Td) from the touch radius. In particular, the anchor point interaction system 106 determines the touch diameter (Td) by simply doubling the touch radius determined in the act 302 of FIG. 3. As illustrated in FIG. 4, the anchor point interaction system 106 determines that the touch diameter (Td) of the user touch gesture equals 40 px.

The series of acts 400 also includes the act 408 of determining the magnification level (Zm) of the magnified view. Generally, the anchor point interaction system 106 determines a magnification level that ensures that the distance between any two anchor points is greater than the touch diameter (TO. Thus, the anchor point interaction system 106 ensures that user interactions in the magnified window will unambiguously select a single anchor point. In at least one embodiment, and as illustrated, the anchor point interaction system 106 may determine the magnification level (Zm) by determining the quotient of the touch diameter (Td) and the minimum distance (Dm). As illustrated, the anchor point interaction system 106 determines, based on the magnification level (Zm) of 1.49, that the magnified view should display an area at 1.49 times of the magnification level of the drawing view.

The anchor point interaction system 106 generates and presents a magnified view of the vector drawing that displays the two or more anchor points at the magnification level. FIGS. 5A-8B illustrate example graphical user interfaces displaying the magnified view together with the drawing view in accordance with one or more embodiments. FIGS. 5A-5D illustrate a series of vector drawing modification graphical user interfaces presenting a magnified view for precise anchor point selection. FIGS. 6A-6B illustrate a series of vector drawing modification graphical user interfaces in which the anchor point interaction system 106 changes the area displayed within the magnified view. FIGS. 7A-8B illustrate how the anchor point interaction system 106 adjusts the area within the magnified view based on user interaction with a magnified view adjustment element.

Figure 5A:
FIGS. 5A-5D illustrate example vector drawing modification graphical user interfaces including a magnified view together with a display view in accordance with one or more embodiments of the present disclosure.
Figure 5B:
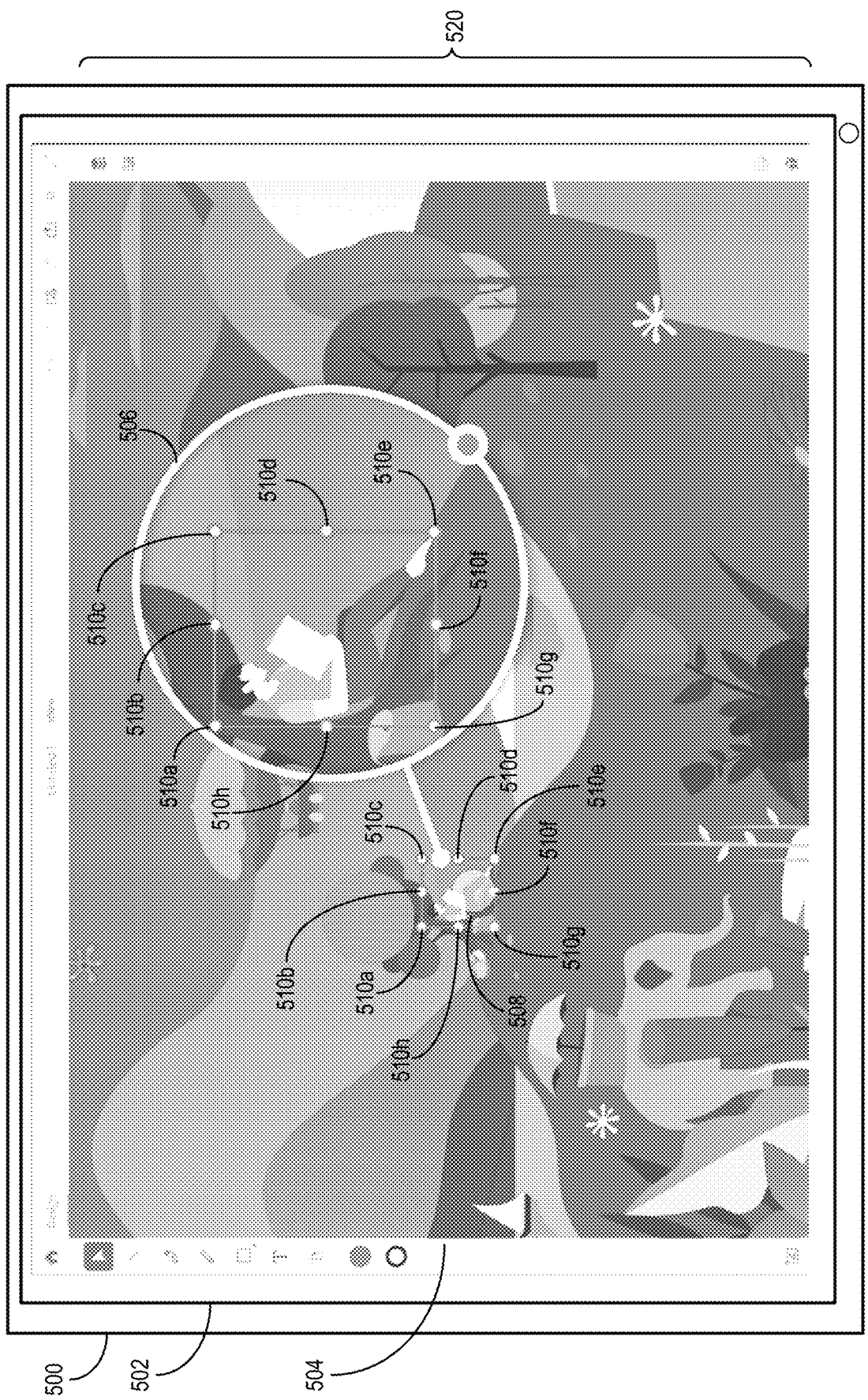
Figure 5C:
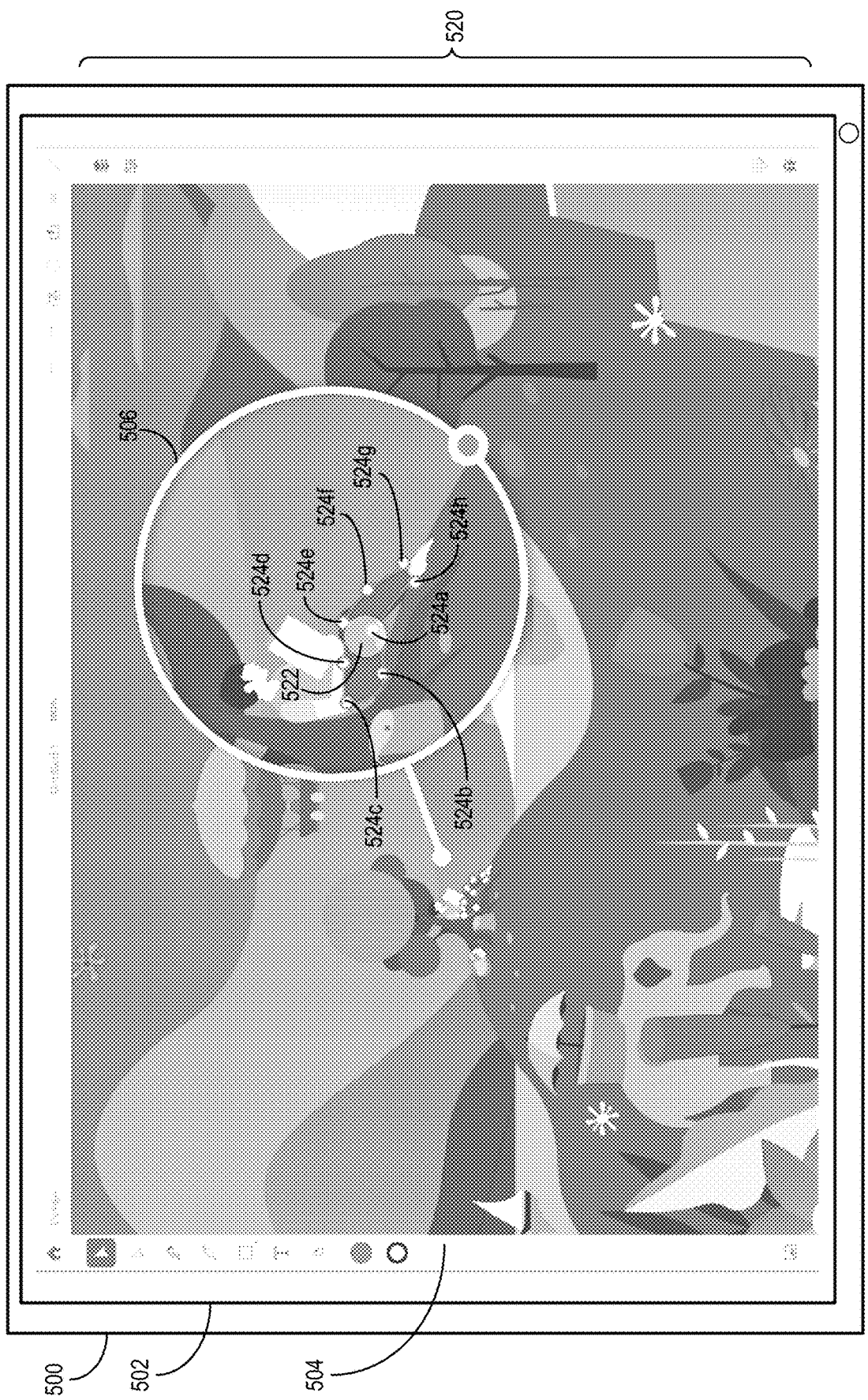
Figure 5D:
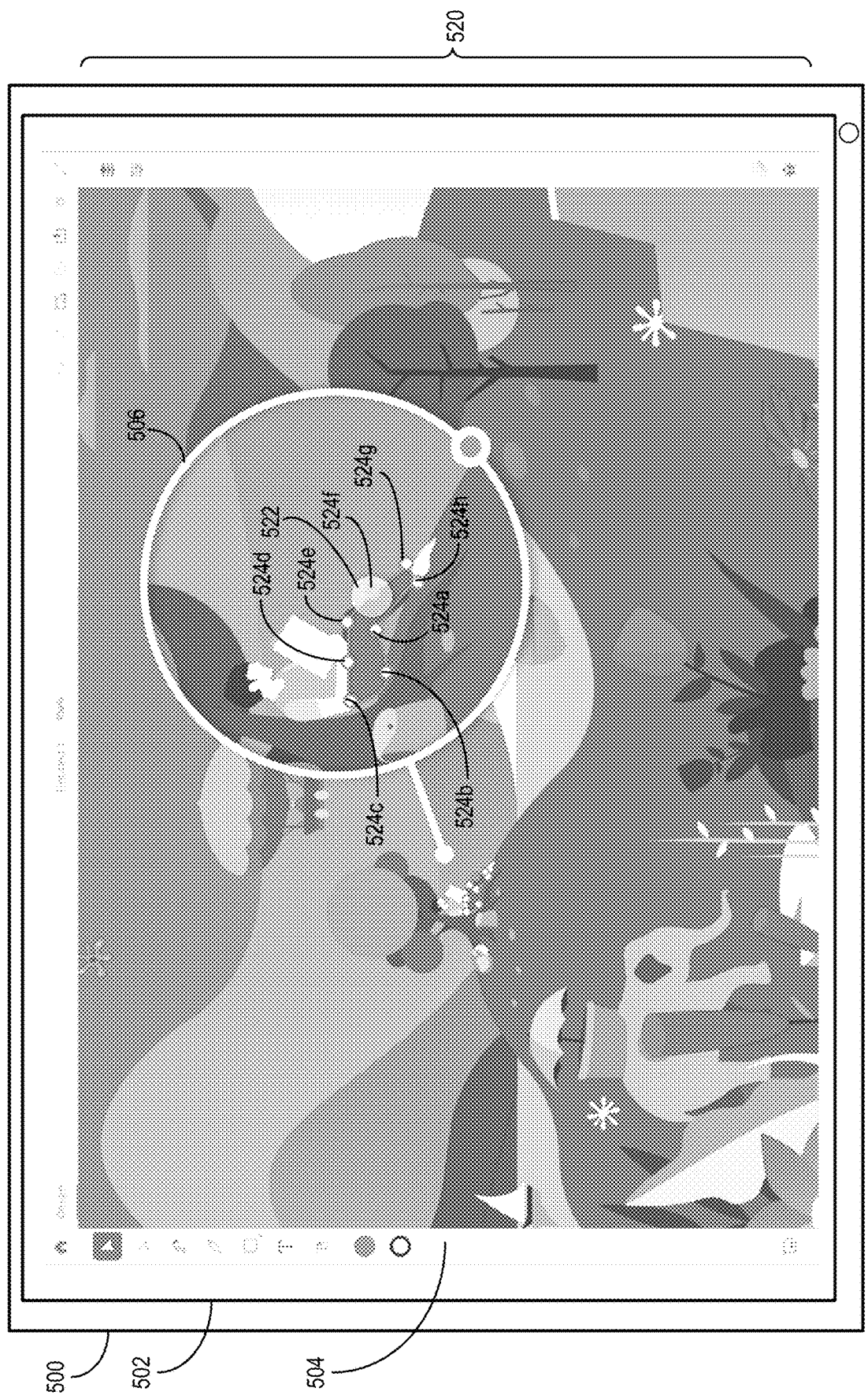

As mentioned, FIGS. 5A-5D illustrate a series of example vector drawing modification graphical user interfaces presenting a magnified view for precise anchor point selection. FIG. 5A illustrates a vector drawing in a drawing view. FIG. 5B illustrates a magnified view together with the drawing view. FIG. 5C illustrates a selection of an object within the magnified view. FIG. 5D illustrates a selection of an anchor point within the selected object within the magnified view.

FIG. 5A illustrates a vector drawing modification graphical user interface 504 presented on a screen 502 of a user client device 500. The vector drawing modification graphical user interface 504 presents a vector drawing in a drawing view 520. As mentioned previously, the magnification level of the drawing view 520 may be determined automatically to display the entire vector drawing. Additionally, the user client device 500 may render the vector drawing at a magnification level based on user input.

The user client device 500 may detect user interaction with the vector drawing in the drawing view 520. The user interaction may include a user touch gesture. As illustrated in FIG. 5A, the user client device 500 detects a user touch gesture 508 with the vector drawing in the drawing view 520. For example, the user touch gesture 508 may include a user tap on the screen 502 with a finger or a touch screen pen. The anchor point interaction system 106 can determine that the user touch gesture 508 results in an ambiguous selection of two or more anchor points. As illustrated, the anchor point interaction system 106 identifies anchor points within the touch area of the user touch gesture 508, even if the anchor points are not currently visible to the user via the vector drawing modification graphical user interface 504. Based on determining that the user touch gesture 508 results in an ambiguous selection of two or more anchor points, the user client device 500 updates the vector drawing modification graphical user interface 504 to include a magnified view.

FIG. 5B illustrates the vector drawing modification graphical user interface 504 displaying a vector drawing in a magnified view 506 together with the drawing view 520. The user client device 500 presents the magnified view 506 of an area about the two or more anchor points at a magnification level as a graphical user interface overlay. For example, as illustrated, the magnified view 506 displays a zoomed-in perspective showing anchor points 510$a$-510$h$. More particularly, the anchor points 510$a$-510$h$ correspond to a group of objects that together form an image of a reading person.

As discussed previously, the anchor point interaction system 106 may automatically present the magnified view 506 based on intelligently determining that the touch area of the user touch gesture 508 encompasses two or more anchor points. Additionally, or alternatively, the user touch gesture 508 may generate and present the magnified view 506 based on a user request for the magnified view. For example, the vector drawing modification graphical user interface 504 may include a selectable magnified view element. The anchor point interaction system 106 may present the magnified view 506 based on detecting user selection of the magnified view element. Alternatively, the anchor point interaction system 106 may associate a touch gesture type with presenting the magnified view 506. For example, the anchor point interaction system 106 may identify the touch area for the user touch gesture 508 based on a first finger tap and hold gesture and present the magnified view 506 based on receiving a tap from a second finger. The anchor point interaction system 106 may associate any other user gesture type with generating and presenting the magnified view 506.

As mentioned with respect to FIG. 4, the anchor point interaction system 106 determines the magnification level for the magnified view based on a minimum distance (Dm) between anchor points. As illustrated in FIG. 5B, the anchor point interaction system 106 determines the magnification level of the magnified view 506 based on the minimum distance between the anchor points 510a-510h. As illustrated, the magnified view 506 displays several objects, each corresponding to multiple anchor points. Instead of presenting a magnified view with an intensely high magnification level to increase the distance between any two anchor points, the anchor point interaction system 106 selects the anchor points 510a-510h as the set of anchor points. Accordingly, the magnified view 506 displays the anchor points 510a-510h at a magnification level at which distances between the anchor points 510a-510h exceed the touch diameter of the user touch gesture 508.

The anchor point interaction system 106 may receive, via the vector drawing modification graphical user interface 504, a user selection within the magnified view 506. As previously mentioned, when initially generating and presenting the magnified view, the anchor point interaction system 106 may selectively display a set of the two or more anchor points (e.g., the anchor points 510a-510h) within the magnified view 506. The anchor point interaction system 106 may determine a selection of one of the anchor points 510a-510h. Alternatively, the anchor point interaction system 106 may receive a user selection that does not intersect with one of the anchor points 510a-510h within the magnified view 506. Based on detecting a user selection that does not intersect with one of the anchor points 510a-510h, the anchor point interaction system 106 displays a different set of anchor points within the magnified view 506.

For example, FIG. 5C illustrates the vector drawing modification graphical user interface 504 including the magnified view 506 displaying a different set of anchor points. In particular, based on detecting a user selection 522 within the magnified view 506, the anchor point interaction system 106 presents the anchor points 524a-524h. Generally, the anchor point interaction system 106 performs hit detection on the art tree to identify anchor points that intersect with the user selection 522 within the magnified view 506. The anchor point interaction system 106 performs the hit detection within the magnified view 506 similar to how the anchor point interaction system 106 performs hit detection within the drawing view as described above with respect to FIG. 3. Based on determining that the anchor point 524a is within the touch area of the user selection 522, the anchor point interaction system 106 presents the anchor points 524a-524h for display in both the magnified view 506 and the drawing view 520.

In one or more embodiments, the anchor point interaction system 106 presents anchor points corresponding to two or more objects within the magnified view 506. For example, the anchor point interaction system 106 might receive a user selection around the anchor point 524d. As illustrated, the anchor point 524d is in close proximity to other objects, including the arm and the book, and presumably their corresponding anchor points. Thus, based on detecting a user selection around the anchor point 524d, the anchor point interaction system 106 may determine to display, within the magnified view 506, anchor points corresponding to the arm and the book. Additionally, or alternatively, the anchor point interaction system 106 may automatically increase the magnification level of the magnified view 506 to facilitate an unambiguous selection of an anchor point. The anchor point interaction system 106 increases the magnification level by using a series of acts similar to the series of acts 400 illustrated in FIG. 4.

The anchor point interaction system 106 may detect user selection of an anchor point within the magnified view 506 and receive user input indicating an operation to be performed on the selected anchor point. FIG. 5D illustrates the user selection 522 within the magnified view 506. In particular, the anchor point interaction system 106 determines that the user selection 522 intersects with the anchor point 524f. Based on the user selection 522, the anchor point interaction system 106 may indicate the selected anchor point. As illustrated, the anchor point interaction system 106 indicates the selection of the anchor point 524f by changing the color of the anchor point 524f. In other embodiments, the anchor point interaction system 106 may indicate the selection of an anchor point using other methods. For instance, the anchor point interaction system 106 may change the shape or size of the selected anchor point or cause the selected anchor point to flash. As further illustrated, the anchor point interaction system 106 updates the drawing view 520 to indicate the selection of the anchor point 524f in parallel with the magnified view 506.

As previously mentioned, and as illustrated in FIG. 5D, the anchor point interaction system 106 can receive, via the vector drawing modification graphical user interface 504, user input indicating an operation to be performed. More particularly, the anchor point interaction system 106 updates both the drawing view 520 and the magnified view 506 to reflect operations performed on selected anchor points. For instance, after receiving the user selection 522 of the anchor point 524f, the anchor point interaction system 106 receives user input indicating an operation to be performed on the anchor point 524f. Specifically, the anchor point interaction system 106 receives, at the user client device 500, user input comprising a tap and drag motion on the anchor point 524f. Based on the user input, the anchor point interaction system 106 performs the operation of moving the anchor point 524f. As illustrated, the anchor point interaction system 106 moves the anchor point 524f to the left based on the received user input.

FIG. 5D illustrates a single combination of a user input with an operation; however, in other embodiments, the anchor point interaction system 106 may associate various other operations with other user inputs. The anchor point interaction system 106 may recognize various types of user input within the magnified view 506. For instance, in addition to recognizing a tap and drag input, the anchor point interaction system 106 may also associate single or multiple taps, press and hold, pinch and zoom, additional pressure, or other inputs with operations. Additionally, or alternatively, rather than relying on different input types, the anchor point interaction system 106 may determine to perform a particular option based on user selection of user operation elements presented within a menu view. In one embodiment, the anchor point interaction system 106 automatically determines associations between user input types and specific operations. In at least one other embodiment, the anchor point interaction system 106 associates user input types with specific operations based on user preference.

In addition to moving a selected anchor point, as illustrated in FIG. 5D, the anchor point interaction system 106 may perform other operations based on user input. Examples of other operations that the anchor point interaction system 106 may perform on the anchor point 524f include deleting the anchor point, converting the anchor point from being a corner point to a smooth point and vice versa, and other operations.

The anchor point interaction system 106 may change the area displayed within the magnified view of the vector drawing modification graphical user interfaces. FIGS. 6A-6B illustrate a series of magnified views displaying different areas of a vector drawing. In particular, FIG. 6A illustrates a magnified view 602 and a drawing view 610 of a vector drawing 600 as part of a vector drawing modification graphical user interface. FIG. 6A illustrates a magnifier handle 604 at a first location 606. As illustrated in FIG. 6A, the magnified view 602 displays a first area 612 of the vector drawing 600. The first area 612 includes anchor points 608a-608h. In one embodiment, the anchor point interaction system 106 associates the first area 612 displayed within the magnified view 602 with the magnifier handle 604 at the first location 606. The anchor point interaction system 106 updates the area displayed within the magnified view 602 based on movement of the magnifier handle 604 to a different location.

Based on detecting user interaction, the anchor point interaction system 106 moves the magnifier handle 604 to a different location and accordingly updates the area shown within the magnified view 602. For example, FIG. 6B illustrates the vector drawing 600 within the drawing view 610 and the magnified view 602 within a vector drawing modification graphical user interface. In particular, FIG. 6B illustrates a second area 614 within the magnified view 602 and the magnifier handle 604 at a second location 613. In contrast with the first area 612 illustrated in FIG. 6A, the second area 614 illustrated in FIG. 6B displays only the anchor points 608a-608d and 608h.

As illustrated in FIG. 6B, the anchor point interaction system 106 presents the second area 614 within the magnified view 602 based on user interaction with the magnifier handle 604. In particular, the anchor point interaction system 106 associates the second location 613 with the second area 614 in the magnified view 602. Thus, based on user interaction, such as a tap and drag gesture, with the magnifier handle 604, the anchor point interaction system 106 moves the magnifier handle 604 to the second location 613 and presents the second area 614 within the magnified view 602.

Figure 7A:
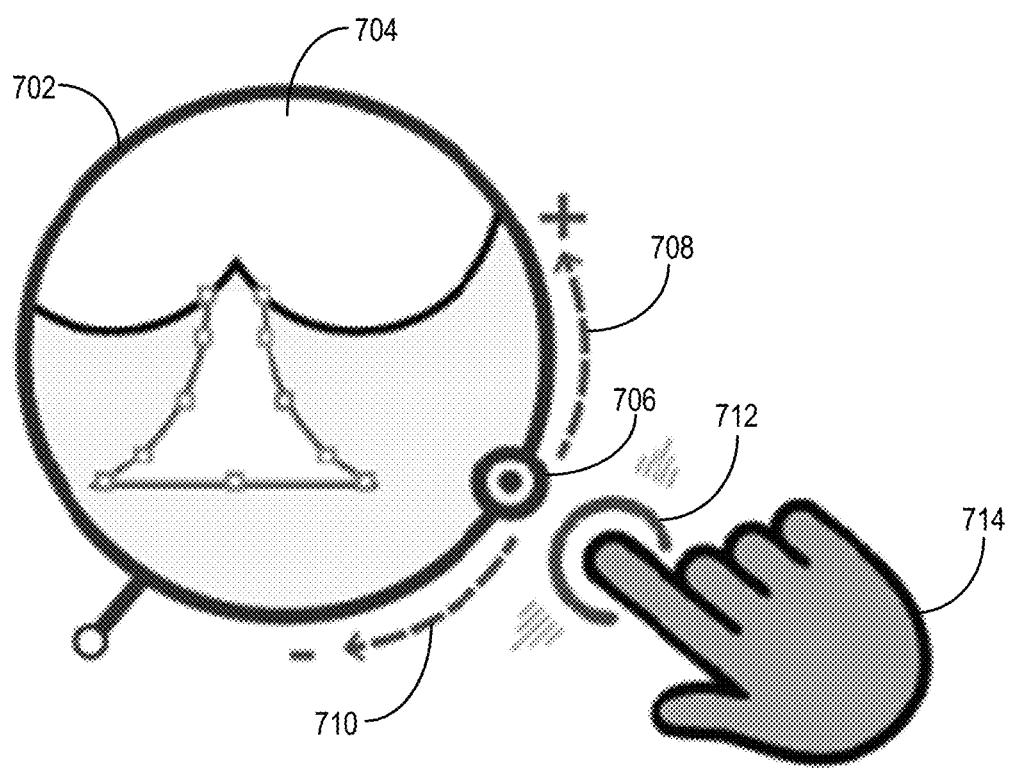
FIGS. 7A-7B illustrate example magnified views within the graphical user interfaces displaying different areas with varying magnification levels based on user interaction with a magnified view adjustment element in accordance with one or more embodiments of the present disclosure.

As previously mentioned, the anchor point interaction system 106 adjusts the area displayed within the magnified view based on user interaction with a magnified view adjustment element. FIG. 7A illustrates a magnified view 702 displaying an area 704 at a magnification level in accordance with one embodiment. The magnified view 702 includes a magnified view adjustment element 706. A user 714 associated with a user client device interact with the magnified view adjustment element 706 via a touch gesture 712. As illustrated, based on detecting that the touch gesture 712 comprises a gesture (e.g., a tap and drag) in a positive direction 708, the anchor point interaction system 106 increases the magnification level of the magnified view 702. Alternatively, based on detecting that the touch gesture 712 comprises a gesture in a negative direction 710, the anchor point interaction system 106 decreases the magnification level of the magnified view 702. In at least one embodiment, the greater the gesture or the farther the user 714 drags the magnified view adjustment element 706, the greater the magnification level adjustment.

Figure 7B:
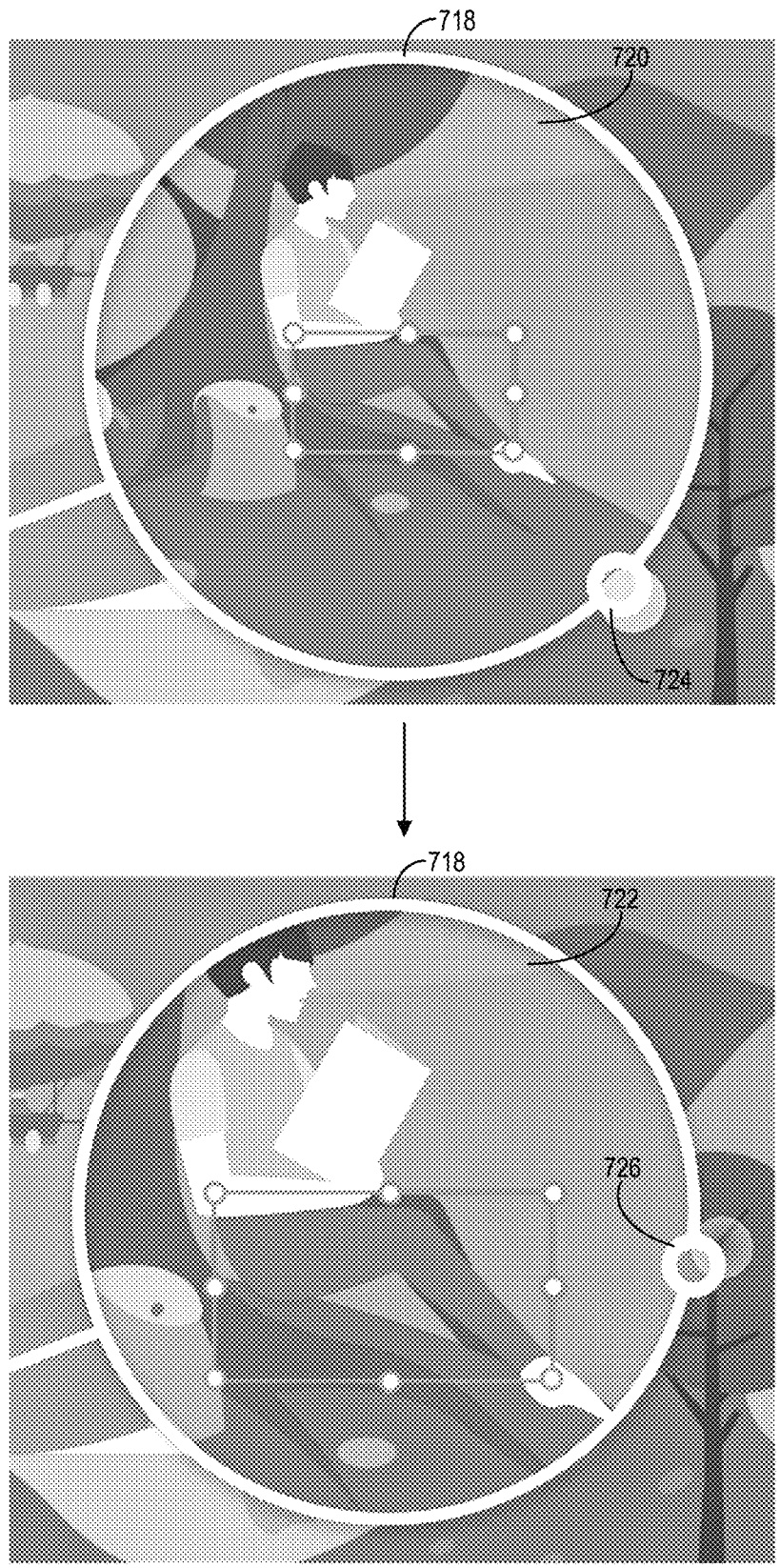

FIG. 7B illustrates an example series of magnified views showing an adjustment in magnification level. In particular, FIG. 7B illustrates a magnified view 718 displaying an area at a default magnification level 720. The magnified view 718 also includes a magnified view adjustment element in a first position 724. Based on detecting a user selection of the magnified view adjustment element in the first position 724 and a gesture in a positive direction, the anchor point interaction system 106 increases the magnification level of the magnified view 718. In at least one embodiment, the anchor point interaction system 106 incrementally increases the magnification level based on how far the user drags the magnified view adjustment element. As illustrated, the anchor point interaction system 106 updates the location of the magnified view adjustment element to a second position 726. Additionally, the anchor point interaction system 106 updates the magnified view 718 to display an area at an increased magnification level 722.

Figure 8A:
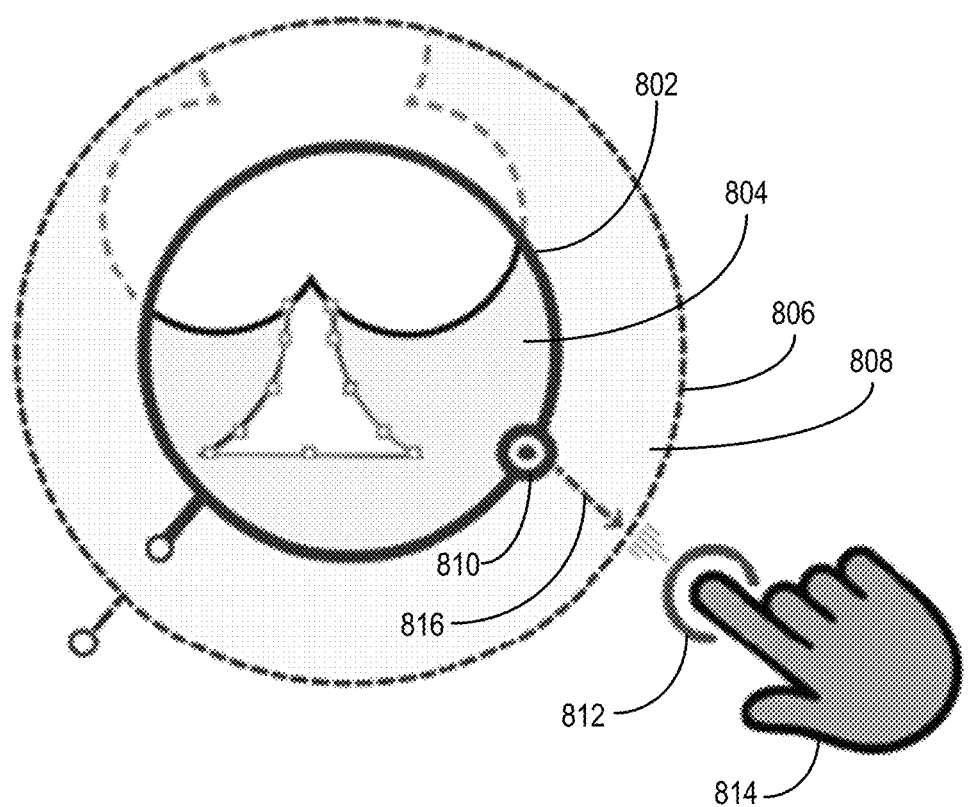
FIGS. 8A-8B illustrate example magnified views within the graphical user interfaces displaying areas of different sizes based on user interaction with a magnified view adjustment element in accordance with one or more embodiments of the present disclosure.
Figure 8B:
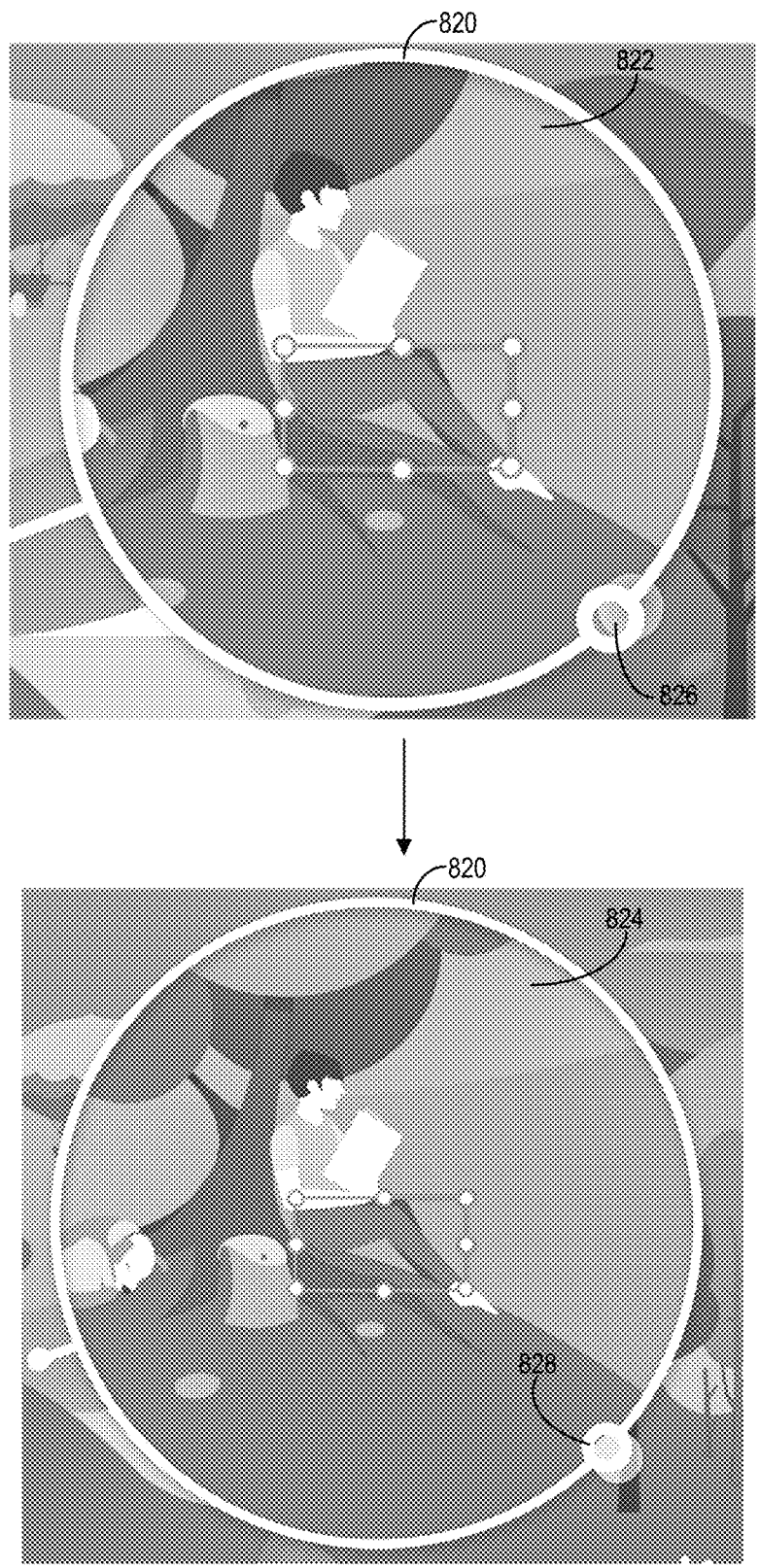

In addition to adjusting the magnification level of a magnified view, the anchor point interaction system 106 may also adjust the size of the area displayed within the magnified view. FIGS. 8A-8B illustrate how the anchor point interaction system 106 adjusts the size of the area within the magnified view based on user interaction with the magnified view adjustment element. In particular, FIG. 8A illustrates a magnified view 802 with a magnified view adjustment element 810. The magnified view 802 displays an area of an initial size 804. Based on a touch gesture 812 from a user 814, the anchor point interaction system 106 can expand or diminish the size of the area displayed within the magnified view 802. For instance, based on detecting the touch gesture 812 dragging the magnified view adjustment element 810 in an expand direction 816, the anchor point interaction system 106 expands the size of the magnified view 802 to an expanded size 806. The magnified view 802 in the expanded size 806 displays an area of a greater size 808. Similarly, based on detecting the touch gesture 812 dragging the magnified view adjustment element 810 in a diminish direction (i.e., opposite of the expand direction 816), the anchor point interaction system 106 decreases the size of the area displayed within the magnified view 802.

FIG. 8B illustrates an example series of magnified views showing an adjustment in magnification level. In particular, FIG. 8B illustrates a magnified view 820 displaying an area of an original size 822. The magnified view 820 includes a magnified view adjustment element in a first position 826. Based on detecting a user selection of the magnified view adjustment element in the first position 826 and a gesture in an expand direction, the anchor point interaction system 106 increases the size of the area within the magnified view 820. In at least one embodiment, the anchor point interaction system 106 incrementally increases size of the area within the magnified view 820 based on how far the user drags the magnified view adjustment element. As illustrated, the anchor point interaction system 106 updates the location of the magnified view adjustment element to a second position 828. The anchor point interaction system 106 also updates the magnified view 820 to display an area of an increased size 824.

Although FIGS. 7A-8B illustrate specific examples of graphical user interface elements in accordance with one or more embodiments, the anchor point interaction system 106 may present alternative graphical user interface elements for adjusting the area displayed within the magnified view. In at least one embodiment, instead of presenting the magnified view adjustment element, the anchor point interaction system 106 may adjust the magnified view based on user gestures within the magnified view. For instance, the anchor point interaction system 106 may increase the magnification level within the magnified view based on detecting a pinch and zoom gesture within the magnified view. Additionally, the anchor point interaction system 106 may present interactive magnified view size elements corresponding to various sizes (e.g., small, medium, and large). The anchor point interaction system 106 may adjust the size of the magnified view based on detected user interaction with the magnified view size elements.

Figure 9:
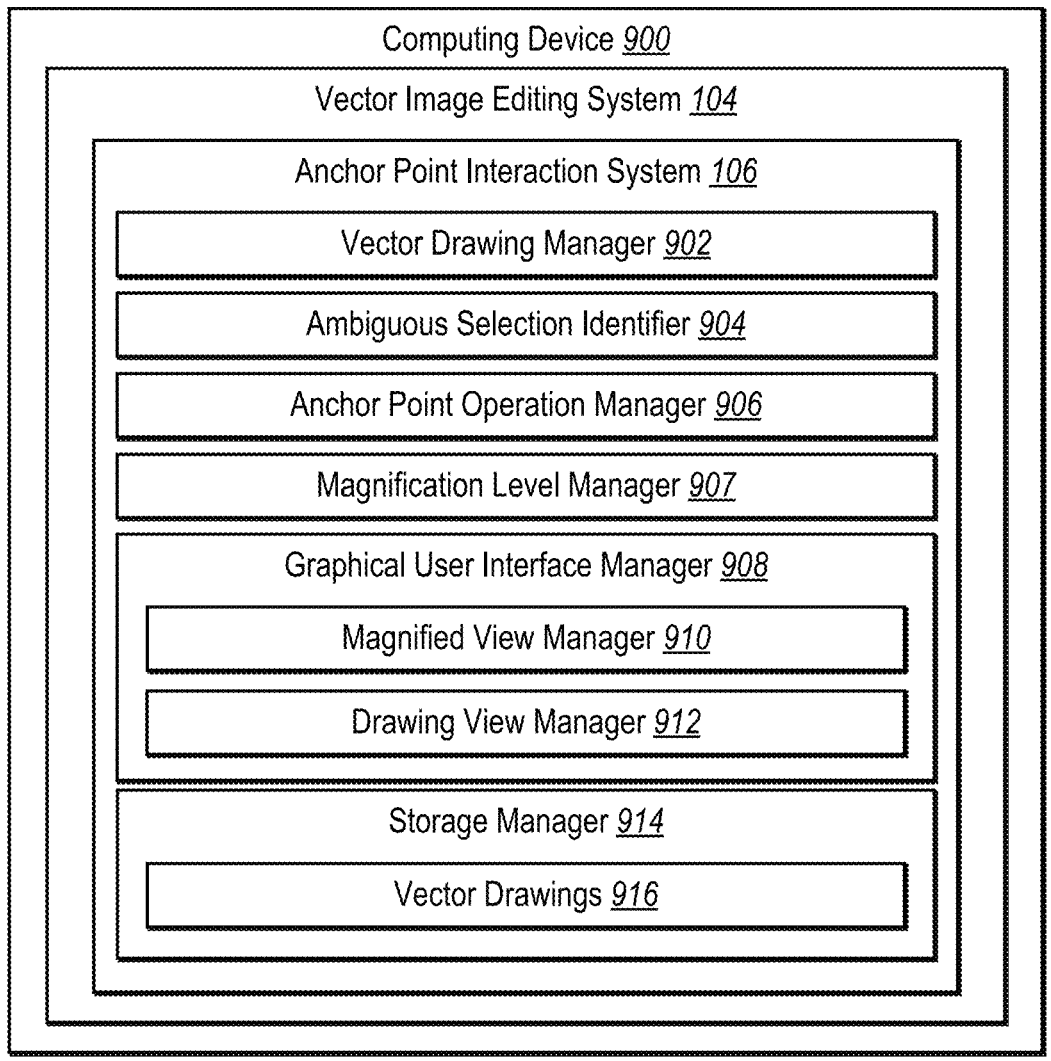
FIG. 9 illustrates a schematic diagram of an example architecture of the anchor point interaction system in accordance with one or more embodiments of the present disclosure.

FIG. 9 illustrates a schematic diagram of components of the anchor point interaction system 106 in accordance with one or more embodiments. As shown, the anchor point interaction system 106 can be implemented by a computing device 900 (e.g., the user client device 109 and/or the server device(s) 102). Additionally, the anchor point interaction system 106 can be part of the vector design editing system 104. The anchor point interaction system 106 can include, but is not limited to, a vector drawing manager 902, an ambiguous selection identifier 904, an anchor point operation manager 906, a magnification level manager 907, a graphical user interface manager 908, and a storage manager 914. The anchor point interaction system 106 can be implemented as part of the vector design editing system 104 in a distributed system of the server devices for generating and managing vector designs. Alternatively, the anchor point interaction system 106 can be implemented on a single computing device such as the user client device 108 of FIG. 1.

In one or more embodiments, each of the components of the anchor point interaction system 106 are in communication with one another using any suitable communication technologies. Additionally, the components of the anchor point interaction system 106 can be in communication with one or more other devices including the user client device 108 as illustrated in FIG. 1. Although the components of the anchor point interaction system 106 are shown as separate in FIG. 9, any of the subcomponents may be combined into fewer components, such as into a single component or divided into more components as may serve a particular implementation. Furthermore, although the components of FIG. 9 are described in connection with the anchor point interaction system 106, at least some of the components for performing operations in conjunction with the anchor point interaction system 106 described herein may be implemented on other devices within the environment.

The components of the anchor point interaction system 106 can include software, hardware, or both. For example, the components of the anchor point interaction system 106 can include one or more instructions stored on a computer-readable storage medium and executable by processors of one or more computing devices (e.g., the user client device 108). When executed by the one or more processors, the computer-executable instructions of the anchor point interaction system 106 can cause the computing devices to perform the anchor point operation methods described herein. Alternatively, the components of the anchor point interaction system 106 can comprise hardware, such as a special purpose processing device to perform a certain function or group of functions. Additionally, or alternatively, the components of the anchor point interaction system 106 can include a combination of computer-executable instructions and hardware.

Furthermore, the components of the anchor point interaction system 106 performing the functions described herein may, for example, be implemented as part of a stand-alone application, as a module of an application, as a plug-in for applications including content management applications, as a library function or functions that may be called by other applications, and/or as a cloud-computing model. Thus, the components of the anchor point interaction system 106 may be implemented as part of a stand-alone application on a personal computing device or a mobile device. Alternatively or additionally, the components of the anchor point interaction system 106 may be implemented in any application that allows creation and delivery of marketing content to users, including, but not limited to, applications in ADOBE® CREATIVE CLOUD®, such as ILLUSTRATOR®, ILLUSTRATOR® DRAW, PHOTOSHOP® SKETCH, AFTER EFFECTS®, and ADOBE® DIMENSION®. "ADOBE", "ILLUSTRATOR", and "ADOBE CREATIVE CLOUD" are registered trademarks of Adobe Inc in the United States and/or other countries.

As shown in FIG. 9, the anchor point interaction system 106 includes the vector drawing manager 902. The vector drawing manager 902 receives, stores, generates, edits, and manages vector drawings. Additionally, the vector drawing manager 902 can store, edit, and manage metadata associated with vector drawings. In particular, the vector drawing manager 902 can receive, store, and manage art trees associated with vector drawings.

The anchor point interaction system 106 also includes the ambiguous selection identifier 904. Generally, the ambiguous selection identifier 904 registers instances where user interactions with a vector drawing result in an ambiguous selection of two or more anchor points. In particular, the ambiguous selection identifier 904 accesses and performs hit detection on an art tree corresponding to the vector drawing. In particular, the ambiguous selection identifier 904 determines a touch location and touch radius of a user touch gesture. The ambiguous selection identifier 904 traverses an art tree to perform hit detection. The ambiguous selection identifier 904 can determine all anchor points within a touch area of the user touch gesture.

As further illustrated in FIG. 9, the anchor point interaction system 106 also includes the anchor point operation manager 906. The anchor point operation manager 906 receives, stores, and executes operations performed on anchor points of a vector drawing. In particular, the anchor point operation manager 906 associates particular user gestures with anchor point operations. For instance, in response to detecting a user tap and drag gesture, the anchor point operation manager may move an anchor point.

The anchor point interaction system 106 also includes the magnification level manager 907. The magnification level manager 907 determines the magnification level at which to display areas within magnified views. Generally, the magnification level manager 907 determines a magnification level that results in a distance between two or more anchor points being at least a touch diameter within a magnified view. In particular, the magnification level manager 907 receives two or more anchor points within a touch area. The magnification level manager 907 determines the minimum distance between the two or more anchor points, determines the touch diameter from the touch radius, and determines the magnification level of the magnified view. Furthermore, the magnification level manager can access the art tree to identify a set of anchor points of the two or more anchor points on which to base the magnification level.

The anchor point interaction system 106 also includes the graphical user interface manager 908. The graphical user interface manager 908 includes a magnified view manager 910 and a drawing view manager 912. The magnified view manager 910 generates and manages graphical user interface elements associated with the magnified view. The magnified view manager 910 communicates with the magnification level manager 907 to determine the magnification level for an area within the magnified view. Furthermore, the magnified view manager 910 receives and manages user input indicating operations within the magnified view. For instance, the magnified view manager 910 updates the area displayed within the magnified view based on detecting a user input of an operation on an anchor point within the magnified view. The magnified view manager 910 can also manage user interaction with the magnified view adjustment element. In particular, the magnified view manager 910 can increase the size of and/or change the magnification level of the area within a magnified view.

As further illustrated in FIG. 9, the graphical user interface manager 908 also includes the drawing view manager 912. Generally, the drawing view manager 912 manages the zoom level of the vector drawing displayed within the drawing view. Additionally, the drawing view manager 912 updates the vector drawing displayed in the drawing view to reflect operations performed on anchor points within the magnified view.

The anchor point interaction system 106 includes the storage manager 914. The storage manager 914 stores (via one or more memory devices) vector drawings 916. The vector drawings 916 include vector drawings and corresponding metadata. More specifically, the vector drawings 916 include metadata such as art trees that indicate the locations and relationships of anchor points, paths, and other vector drawing elements.

Figure 10:
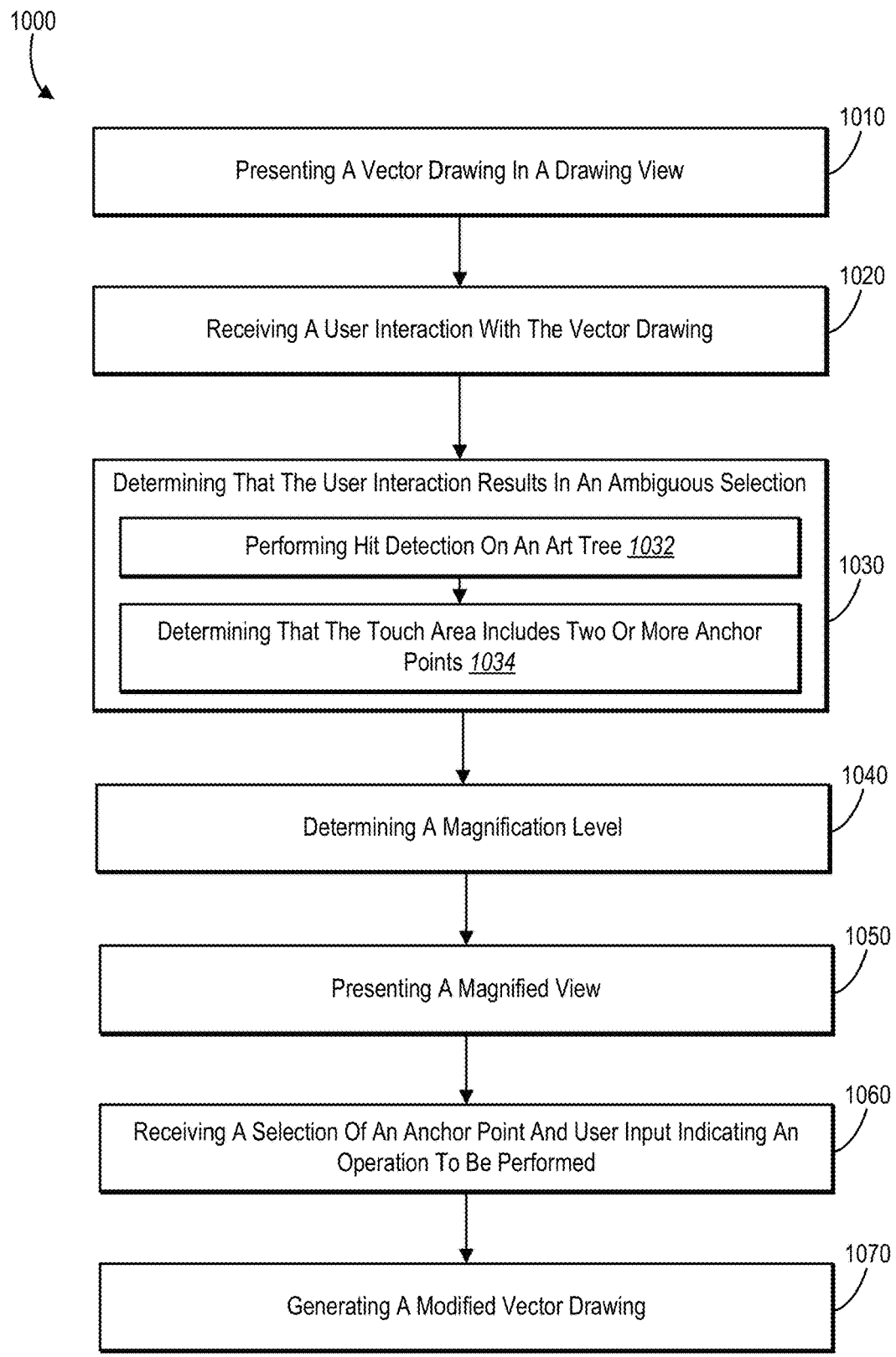
FIG. 10 illustrates a series of acts for generating a modified vector drawing based on user input in a magnified view in accordance with one or more embodiments of the present disclosure.

FIG. 10 illustrates a flowchart of a method for receiving and performing operations on anchor points via a magnified view. While FIG. 10 illustrates acts according to one embodiment, alternative embodiments may omit, add to, reorder, and/or modify any of the acts shown in FIG. 10. The acts of FIG. 10 can be performed as part of a method. Alternatively, a non-transitory computer readable medium can comprise instructions that, when executed by one or more processors, cause the computing device to perform the acts of FIG. 10. In still further embodiments, a system can perform the acts of FIG. 10.

As shown in FIG. 10, the series of acts 1000 includes an act 1010 of presenting a vector drawing in a drawing view. In particular, the act 1010 comprises presenting, via a graphical user interface at a user client device, a vector drawing comprising anchor points in a drawing view.

The series of acts 1000 includes an act 1020 of receiving a user interaction with the vector drawing. In particular, the act 1020 comprises receiving, via the graphical user interface, a user interaction with the vector drawing. In at least one embodiment, the user interaction comprises a user touch gesture of a touch area at a touch location.

The series of acts 1000 includes an act 1030 of determining that the user interaction results in an ambiguous selection. In particular, the act 1030 comprises determining that the user interaction results in an ambiguous selection of two or more anchor points of the anchor points. Additionally, the act 1030 can include determining that the user interaction results in an ambiguous selection by performing an act 1032 of performing hit detection on an art tree and an act 1034 of determining that the touch area includes two or more anchor points. In particular, the act 1032 comprises performing hit detection on an art tree corresponding with the vector drawing to identify anchor points within the touch area. The act 1034 comprises determining that the touch area at the touch location includes the two or more anchor points.

As further illustrated in FIG. 10, the series of acts 1000 includes an act 1040 of determining a magnification level. In particular, the act 1040 comprises determining a magnification level that results in a distance between the two or more anchor points being at least a touch diameter. In at least one embodiment, the act 1040 comprises determining the magnification level based on a quotient of the touch diameter of the touch area and a minimum distance between the two or more anchor points. In at least one embodiment, the minimum distance between the two or more anchor points comprises a minimum distance between a set of the two or more anchor points.

The series of acts 1000 includes an act 1050 of presenting a magnified view. In particular, the act 1050 comprises presenting, together with the drawing view, a magnified view of an area about the two or more anchor points at the magnification level.

The series of acts 1000 includes an act 1060 of receiving a selection of an anchor point and user input indicating an operation to be performed. In particular, the act 1060 comprises receiving, via the graphical user interface, a selection of an anchor point of the two or more anchor points and user input indicating an operation to be performed on the selected anchor point. In at least one embodiment, the user input comprises dragging the anchor point from a first location to a second location; and the operation comprises moving the anchor point from the first location to the second location.

As illustrated in FIG. 10, the series of acts 1000 includes an act 1070 of generating a modified vector drawing. In particular, the act 1070 comprises generating a modified vector drawing by performing the operation on the selected anchor point.

The series of acts 1000 can include an additional act of presenting, via the graphical user interface, the modified vector drawing in an updated drawing view and in an updated magnification view. The series of acts 1000 can also include additional acts of presenting, via the graphical user interface, a magnification level modification element; and based on detecting user interaction with the magnification level modification element, changing the magnification level of the magnified view. Furthermore, the series of acts 1000 can include additional acts of presenting, via the graphical user interface, a magnified view adjustment element; and based on detecting user interaction with the magnified view adjustment element, adjust the size of the area about the two or more anchor points of the magnified view.

In addition (or in the alternative) to the acts described above, in some embodiments, the series of acts 1000 include a step for generating a manipulatable magnified view of the vector drawing that includes the two or more anchor points separated by a distance of at least a touch diameter. For example, the acts described in reference to FIG. 4 can comprise the corresponding acts (or structure) for performing a step for generating a manipulatable magnified view of the vector drawing.

Embodiments of the present disclosure may comprise or utilize a special purpose or general-purpose computer including computer hardware, such as, for example, one or more processors and system memory, as discussed in greater detail below. Embodiments within the scope of the present disclosure also include physical and other computer-readable media for carrying or storing computer-executable instructions and/or data structures. In particular, one or more of the processes described herein may be implemented at least in part as instructions embodied in a non-transitory computer-readable medium and executable by one or more computing devices (e.g., any of the media content access devices described herein). In general, a processor (e.g., a microprocessor) receives instructions, from a non-transitory computer-readable medium, (e.g., a memory, etc.), and executes those instructions, thereby performing one or more processes, including one or more of the processes described herein.

Computer-readable media can be any available media that can be accessed by a general purpose or special purpose computer system. Computer-readable media that store computer-executable instructions are non-transitory computer-readable storage media (devices). Computer-readable media that carry computer-executable instructions are transmission media. Thus, by way of example, and not limitation, embodiments of the disclosure can comprise at least two distinctly different kinds of computer-readable media: non-transitory computer-readable storage media (devices) and transmission media.

Non-transitory computer-readable storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to non-transitory computer-readable storage media (devices) (or vice versa). For example, computer-executable instructions or data structures received over a network or data link can be buffered in RAM within a network interface module (e.g., a "NIC"), and then eventually transferred to computer system RAM and/or to less volatile computer storage media (devices) at a computer system. Thus, it should be understood that non-transitory computer-readable storage media (devices) can be included in computer system components that also (or even primarily) utilize transmission media.

Computer-executable instructions comprise, for example, instructions and data which, when executed at a processor, cause a general purpose computer, special purpose computer, or special purpose processing device to perform a certain function or group of functions. In some embodiments, computer-executable instructions are executed on a general-purpose computer to turn the general-purpose computer into a special purpose computer implementing elements of the disclosure. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the disclosure may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Embodiments of the present disclosure can also be implemented in cloud computing environments. Cloud computing is a model for enabling on-demand network access to a shared pool of configurable computing resources. For example, cloud computing can be employed in the marketplace to offer ubiquitous and convenient on-demand access to the shared pool of configurable computing resources. The shared pool of configurable computing resources can be rapidly provisioned via virtualization and released with low management effort or service provider interaction, and then scaled accordingly.

A cloud-computing model can be composed of various characteristics such as, for example, on-demand self-service, broad network access, resource pooling, rapid elasticity, measured service, and so forth. A cloud-computing model can also expose various service models, such as, for example, Software as a Service ("SaaS"), Platform as a Service ("PaaS"), and Infrastructure as a Service ("IaaS"). A cloud-computing model can also be deployed using different deployment models such as private cloud, community cloud, public cloud, hybrid cloud, and so forth. In this description and in the claims, a "cloud-computing environment" is an environment in which cloud computing is employed.

Figure 11:
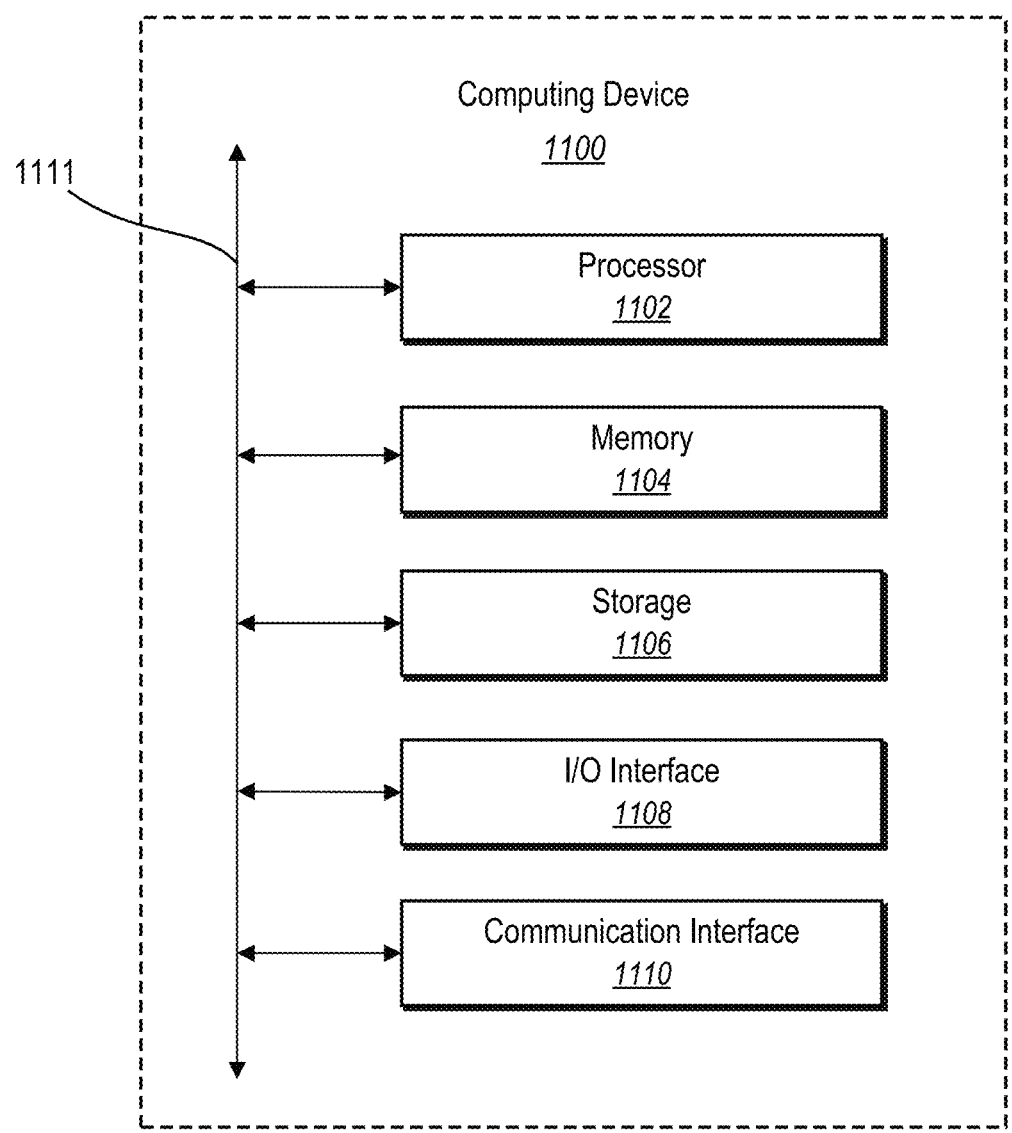
FIG. 11 illustrates a block diagram of an example computing device in accordance with one or more embodiments of the present disclosure.

FIG. 11 illustrates a block diagram of a computing device 1100 that may be configured to perform one or more of the processes described above. One will appreciate that one or more computing devices such as the computing device 1100 may implement the anchor point interaction system 106 and the vector design editing system 104. As shown by FIG. 11, the computing device 1100 can comprise a processor 1102, a memory 1104, a storage device 1106, an I/O interface 1108, and a communication interface 1110, which may be communicatively coupled by way of a communication infrastructure 1111. In certain embodiments, the computing device 1100 can include fewer or more components than those shown in FIG. 11. Components of the computing device 1100 shown in FIG. 11 will now be described in additional detail.

In one or more embodiments, the processor 1102 includes hardware for executing instructions, such as those making up a computer program. As an example and not by way of limitation, to execute instructions for dynamically modifying workflows, the processor 1102 may retrieve (or fetch) the instructions from an internal register, an internal cache, the memory 1104, or the storage device 1106 and decode and execute them. The memory 1104 may be a volatile or non-volatile memory used for storing data, metadata, and programs for execution by the processor(s). The storage device 1106 includes storage, such as a hard disk, flash disk drive, or other digital storage device, for storing data or instructions for performing the methods described herein.

The I/O interface 1108 allows a user to provide input to, receive output from, and otherwise transfer data to and receive data from computing device 1100. The I/O interface 1108 may include a mouse, a keypad or a keyboard, a touch screen, a camera, an optical scanner, network interface, modem, other known I/O devices or a combination of such I/O interfaces. The I/O interface 1108 may include one or more devices for presenting output to a user, including, but not limited to, a graphics engine, a display (e.g., a display screen), one or more output drivers (e.g., display drivers), one or more audio speakers, and one or more audio drivers. In certain embodiments, the I/O interface 1108 is configured to provide graphical data to a display for presentation to a user. The graphical data may be representative of one or more graphical user interfaces and/or any other graphical content as may serve a particular implementation.

The communication interface 1110 can include hardware, software, or both. In any event, the communication interface 1110 can provide one or more interfaces for communication (such as, for example, packet-based communication) between the computing device 1100 and one or more other computing devices or networks. As an example and not by way of limitation, the communication interface 1110 may include a network interface controller (NIC) or network adapter for communicating with an Ethernet or other wire-based network or a wireless NIC (WNIC) or wireless adapter for communicating with a wireless network, such as a WI-FI.

Additionally, the communication interface 1110 may facilitate communications with various types of wired or wireless networks. The communication interface 1110 may also facilitate communications using various communication protocols. The communication infrastructure 1112 may also include hardware, software, or both that couples components of the computing device 1100 to each other. For example, the communication interface 1110 may use one or more networks and/or protocols to enable a plurality of computing devices connected by a particular infrastructure to communicate with each other to perform one or more aspects of the processes described herein. To illustrate, the digital content campaign management process can allow a plurality of devices (e.g., a client device and server devices) to exchange information using various communication networks and protocols for sharing information such as digital messages, user interaction information, engagement metrics, or campaign management resources.

In the foregoing specification, the present disclosure has been described with reference to specific exemplary embodiments thereof. Various embodiments and aspects of the present disclosure(s) are described with reference to details discussed herein, and the accompanying drawings illustrate the various embodiments. The description above and drawings are illustrative of the disclosure and are not to be construed as limiting the disclosure. Numerous specific details are described to provide a thorough understanding of various embodiments of the present disclosure.

The present disclosure may be embodied in other specific forms without departing from its spirit or essential characteristics. The described embodiments are to be considered in all respects only as illustrative and not restrictive. For example, the methods described herein may be performed with less or more steps/acts or the steps/acts may be performed in differing orders. Additionally, the steps/acts described herein may be repeated or performed in parallel with one another or in parallel with different instances of the same or similar steps/acts. The scope of the present application is, therefore, indicated by the appended claims rather than by the foregoing description. All changes that come within the meaning and range of equivalency of the claims are to be embraced within their scope.

What is claimed is:

1. A non-transitory computer readable medium for generating vector designs, the non-transitory computer readable medium comprising instructions that, when executed by at least one processor, cause a computing device to:
   present, via a graphical user interface at a user client device, a vector drawing comprising anchor points in a drawing view;
   receive, via the graphical user interface, a user interaction with the vector drawing;
   determine that the user interaction results in an ambiguous selection of two or more anchor points of the anchor points;
   determine a magnification level that results in a distance between the two or more anchor points being at least a touch diameter;
   present, together with the drawing view, a magnified view of an area about the two or more anchor points at the magnification level;
   receive, via the graphical user interface, a selection of an anchor point of the two or more anchor points and user input indicating an operation to be performed on the selected anchor point; and
   generate a modified vector drawing by performing the operation on the selected anchor point.

2. The non-transitory computer readable medium as recited in claim 1, wherein the user interaction comprises a user touch gesture of a touch area at a touch location.

3. The non-transitory computer readable medium as recited in claim 2, further comprising instructions that, when executed by the at least one processor, cause the computing device to determine that the user interaction results in an ambiguous selection by:
   performing hit detection on an art tree corresponding with the vector drawing to identify anchor points within the touch area; and
   determining that the touch area at the touch location includes the two or more anchor points.

4. The non-transitory computer readable medium as recited in claim 2, further comprising instructions that, when executed by the at least one processor, cause the computing device to determine the magnification level based on a quotient of the touch diameter of the touch area and a minimum distance between the two or more anchor points.

5. The non-transitory computer readable medium as recited in claim 4, wherein the minimum distance between the two or more anchor points comprises a shortest distance between a set of the two or more anchor points.

6. The non-transitory computer readable medium as recited in claim 1, further comprising instructions that, when executed by the at least one processor, cause the computing device to present, via the graphical user interface, the modified vector drawing in an updated drawing view and in an updated magnification view.

7. The non-transitory computer readable medium as recited in claim 1, further comprising instructions that, when executed by the at least one processor, cause the computing device to:
present, via the graphical user interface, a magnification level modification element; and
based on detecting user interaction with the magnification level modification element, change the magnification level of the magnified view.

8. The non-transitory computer readable medium as recited in claim 1, further comprising instructions that, when executed by the at least one processor, cause the computing device to:
present, via the graphical user interface, a magnified view adjustment element; and
based on detecting user interaction with the magnified view adjustment element, adjust a size of the area about the two or more anchor points of the magnified view.

9. The non-transitory computer readable medium as recited in claim 1, wherein:
the user input comprises dragging the selected anchor point from a first location to a second location; and
the operation comprises moving the selected anchor point from the first location to the second location.

10. A system comprising:
at least one non-transitory computer readable storage medium storing a vector drawing comprising anchor points; and
at least one server configured to cause the system to:
present, via a graphical user interface at a user client device, the vector drawing comprising the anchor points in a drawing view;
receive, via the graphical user interface, a user touch gesture with the vector drawing;
determine that the user touch gesture results in an ambiguous anchor point selection by determining that a touch area of the user touch gesture includes two or more anchor points;
generate and present a magnified view of the vector drawing that displays the two or more anchor points with a distance between the two or more anchor points of at least a touch diameter of the touch area;
receive, via the graphical user interface, a selection of an anchor point of the two or more anchor points and user input indicating an operation to be performed on the selected anchor point; and
generate a modified vector drawing by performing the operation on the selected anchor point.

11. The system as recited in claim 10, wherein the at least one server is further configured to cause the system to determine that the user touch gesture results in an ambiguous anchor point selection by performing hit detection on an art tree corresponding with the vector drawing to identify anchor points within the touch area.

12. The system as recited in claim 10, wherein the at least one server is further configured to cause the system to generate and present the magnified view by determining a magnification level for the magnified view based on a quotient of the touch diameter of the touch area and a minimum distance between the two or more anchor points, wherein the magnified view comprises an area about the two or more anchor points at the magnification level.

13. The system as recited in claim 12, wherein the minimum distance between the two or more anchor points comprises a shortest distance between a set of the two or more anchor points.

14. The system as recited in claim 10, wherein the at least one server is further configured to cause the system to present, via the graphical user interface, the modified vector drawing in an updated drawing view and in an updated magnification view.

15. The system as recited in claim 10, wherein the at least one server is further configured to cause the system to:
present, via the graphical user interface, a magnification level modification element; and
based on detecting user interaction with the magnification level modification element, change the magnification level of the magnified view.

16. The system as recited in claim 10, wherein the at least one server is further configured to cause the system to:
present, via the graphical user interface, a magnified view adjustment element; and
based on detecting user interaction with the magnified view adjustment element, adjust a size of the magnified view.

17. The system as recited in claim 10, wherein:
the user input comprises dragging the anchor point from a first location to a second location; and
the operation comprises moving the anchor point from the first location to the second location.

18. In a digital medium environment for generating vector drawings, a computer-implemented method for performing edit operations comprising:
presenting, via a graphical user interface at a user client device, a vector drawing comprising anchor points in a drawing view;
determining that a user touch gesture with the vector drawing results in an ambiguous selection of two or more anchor points;
performing a step for generating a manipulatable magnified view of the vector drawing that includes the two or more anchor points separated by a distance of at least a touch diameter; and
receiving, via the graphical user interface, a selection of an anchor point of the two or more anchor points and user input indicating an operation to be performed on the selected anchor point; and
generate a modified vector drawing by performing the operation on the selected anchor point.

19. The method as recited in claim 18, further comprising presenting, via the graphical user interface, the modified vector drawing in an updated drawing view and in an updated magnification view.

20. The method as recited in claim 18 further comprising:
presenting, via the graphical user interface, a magnified view adjustment element; and
based on detecting user interaction with the magnified view adjustment element, adjusting at least one of a size or a magnification level of an area displayed within the manipulatable magnified view.

* * * * *